(12) United States Patent
Lomayev et al.

(10) Patent No.: US 11,394,439 B2
(45) Date of Patent: Jul. 19, 2022

(54) INTELLIGENT DISTRIBUTED RELAY SYSTEM

(71) Applicant: Intel Corporation, Santa Clara, CA (US)

(72) Inventors: Artyom Lomayev, Nizhny Novgorod (RU); Fatemeh Fazel Sarjoui, Hillsboro, OR (US); Andrey Pudeyev, Nizhny Novgorod (RU); Alexander Maltsev, Nizhny Novgorod Niz (RU); Ali Sadri, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/030,765

(22) Filed: Sep. 24, 2020

(65) Prior Publication Data

US 2021/0242916 A1 Aug. 5, 2021

Related U.S. Application Data

(60) Provisional application No. 62/968,351, filed on Jan. 31, 2020.

(51) Int. Cl.
*H04B 7/06* (2006.01)
*H04B 1/04* (2006.01)
*H04B 7/155* (2006.01)
*H04B 7/024* (2017.01)

(52) U.S. Cl.
CPC ............. *H04B 7/0617* (2013.01); *H04B 1/04* (2013.01); *H04B 7/024* (2013.01); *H04B 7/15535* (2013.01); *H04B 7/15557* (2013.01); *H04B 2001/0408* (2013.01)

(58) Field of Classification Search
CPC ........ H04B 7/0617; H04B 1/04; H04B 7/024; H04B 7/15535; H04B 7/15557; H04B 2001/0408
See application file for complete search history.

(56) References Cited

U.S. PATENT DOCUMENTS

| 2012/0159279 | A1* | 6/2012 | Braithwaite | ........ H04W 84/047 714/751 |
| 2014/0348055 | A1* | 11/2014 | Hoymann | .......... H04B 7/15557 370/315 |
| 2019/0380099 | A1* | 12/2019 | Hakola | .................. H04B 7/088 |

* cited by examiner

*Primary Examiner* — Janice N Tieu
(74) *Attorney, Agent, or Firm* — Banner & Witcoff Ltd.

(57) ABSTRACT

Techniques are disclosed for implementing am Intelligent Distributed Relay (IDR). The IDR may advantageously use the best qualities of both amplify-and-forward and decode-and-forward solutions. The advantageously leverages the use of a digital signal processing (DSP) circuitry, which may decode the data and control information. The control information may be used to control IDR behavior (e.g., in the uplink and/or downlink directions) and to enhance its characteristics.

18 Claims, 15 Drawing Sheets

600

INTELLIGENT DISTRIBUTED RELAY SYSTEM

CROSS REFERENCE TO RELATED APPLICATIONS

This application claims priority to provisional application No. 62/968,351, filed on Jan. 31, 2020, the contents of which are incorporated herein by reference in their entirety.

TECHNICAL FIELD

This disclosure generally relates to systems and methods for wireless communications and, more particularly, to the implementation and architecture of intelligent distributed relays.

BACKGROUND

Wireless devices are becoming widely prevalent and are increasingly requesting access to wireless channels. The growing density of wireless deployments require increased network and spectrum availability. Current techniques to improve wireless coverage areas have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
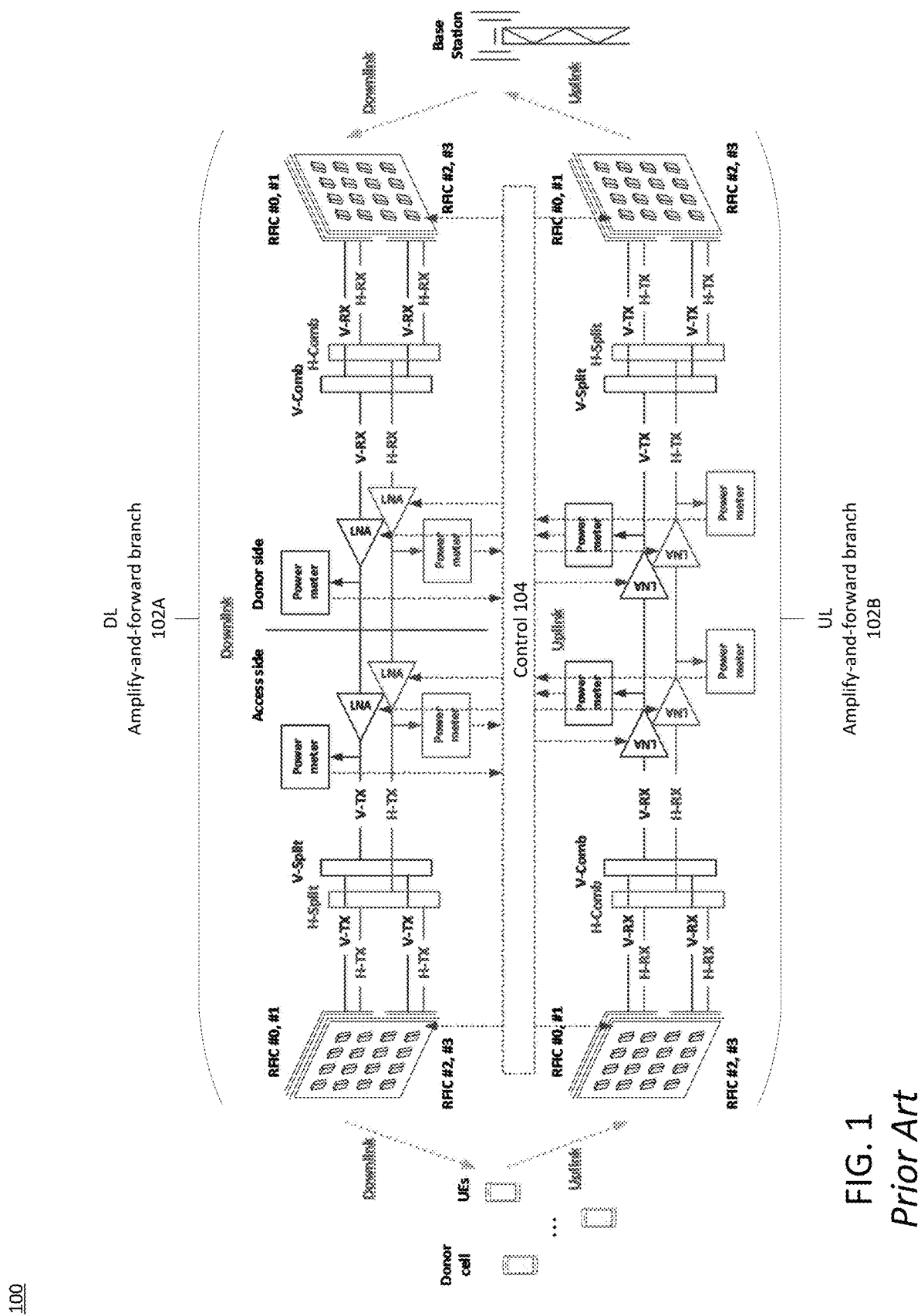
FIG. 1 illustrates an example an example block diagram of a known amplify-and-forward relay architecture.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

5G strives to achieve connect billions of devices with multi-gigabit speeds, lower latency, improved coverage and reliability, low-cost, energy efficient, and environmentally-friendly operation. The mmWave bands are considered as of the frequencies of choice for 5G, and initially were designated for Fixed Wireless Access (FWA). Moreover, it is well-known that signals in the millimeter-wave bands (e.g., 28-70 GHz) have a propagation of a quasi-optic nature, so various obstacles severely decrease the signal strength, unlike in the lower bands. For instance, mmWave signal strength is susceptible to severe attenuation by objects in the propagation path such as rain, trees, walls, tinted glass, etc.

The first 5G NR network trials have shown that the mmWave coverage in urban areas is spotty and has coverage issues, which prevents operators from wide systems deployment. The coverage issue is caused by the signal propagation properties in the mmWave band. In fact, most of the power is propagated through the Line Of Sight (LOS); first and second order reflections and a fraction of power received due to diffraction and objects penetration is negligible. Previous solutions include mmWave Distributed Relay (mDR) systems, such as amplify-and-forward relay solutions developed to enhance the coverage for the 5G NR networks operating in the mmWave FR2 28 GHz band. This is a low cost and low complexity solution enabling SNR and throughput enhancements in shadow zones.

Such amplify-and-forward relays, commonly referred in 3GPP terminology as "repeaters," function to amplify and forward received analog signal with possible carriers to intermediate (and intermediate to carrier) frequency conversion. Once installed, these repeaters continuously forward received signals regardless of whether there is a terminal in their access area or not. Thus, repeaters are transparent to both the terminal and Base Station (BS), do not require standard support (except for the regulation requirements and conformance tests), and guarantee minimal possible end-to-end latency. All these factors make mDRs a key element of the future 5G NR network infrastructure.

The nature of the repeater system to amplify and forward received input signals implies that, besides the signal of interest, the repeater may also amplify and forward undesired noise and interference. This creates a disadvantage of an amplify-and-forward relays compared to decode-and-forward relay solutions which, as the name suggests, decode and re-encode the received signal prior to forwarding it to the served users. Therefore, decode-and-forward relays do not amplify the noise and interference, as is the case with repeaters. However, doing so introduces a larger delay or latency, which may be longer than the LTE sub-frame duration of 1 ms in some cases. Therefore, decode-and-forward relays may not be a transparent solution for the base station and served users, and require standard support, which adds the complexity and, in turn, increases the cost of the solution.

To address these issues, the aspects described herein propose a concept of an Intelligent Distributed Relay system (IDR). Although described throughout the disclosure for mmWave frequency applications (referred to in such cases as an mIDR), the aspects described herein are not limited to mmWave frequency operation, and may be applied to any suitable frequency or band of frequencies. The IDR aspects further discussed throughout this disclosure may advantageously use the best qualities of both amplify-and-forward and decode-and-forward solutions. To do so, the IDR aspects presume that a signal is amplified and forwarded with no significant delay, but at the same time advantageously leverage the use of Digital Signal Processing (DSP) control circuitry, which may decode the data and control information and use it to control IDR behavior (e.g., in the uplink and/or downlink directions) and to enhance its characteristics.

The aspects as further described herein include two approaches for implementation of DSP control unit. In the first approach, DSP control unit of the IDR reuses User Equipment (UE). In accordance with these aspects, a UE chip receives an input signal, decodes the input signal, and extracts all needed control information. Moreover, although the IDR has an amplify-and-forward branch, this branch may be controlled by the UE device. The UE device also has extended capabilities, and thus the IDR need not use them all to control the relay retransmission. However, the UE device is generally a cost-effective solution to do so, is widely available via mass market production, and possesses all needed embedded capabilities.

In the second approach, a DSP control unit of IDR is specifically designed for use with the relay device. In accordance with such aspects, the DSP control unit has a reduced set of capabilities dedicated to this particular implementation. The advantage of this approach is reduced cost, a reduced set of features only needed for the customized implementation, the utilization of a system-on-a chip (SoC) design, and a design that is not dependent on external vendors.

Regardless of the particular approach that is used for the implementation of the DSP control unit, aspects include the DSP control unit of the IDR facilitating the implementation of a set of functions, as further discussed herein. These functions may include, for instance, any suitable set of functions such as synchronization, power control, beamforming, sub channelization, control information extraction, etc.

The synchronization control function allows for the acquisition of digital synchronization using the Synchronization Signal Block (SSB) and, in conjunction with a decoded Time Division Duplex (TDD) pattern, also allows for accurate Downlink (DL) to Uplink (UL) and UL to DL switching. For example, if there is no UL transmission scheduled in a given time slot, then the IDR prevents re-transmission during this time interval and, in turn, reduces noise and interference amplification.

The power control function allows the transmit power to be setup for the DL and UL associated with the IDR in the proper manner. This means that the UE served to this relay can correctly adjust its transmit power (based on DL path loss measurements) to get a desired receive power at the base station end.

The beamforming control function allows channel estimation using a pilot signal structure.

For example, the Demodulation Reference Signal (DM-RS) of the SSB block may be used for this purpose. Based on the calculated channel estimation, the DSP control circuitry predicts Antenna Weight Vectors (AWVs) for TX and RX phased antenna arrays. However, the IDR performing the AWVs computation need not rely solely on the Radio Frequency (RF) receive power measurement, but may additionally or alternatively utilize fine time/frequency channel structure estimation for this purpose.

The sub channelization control function allows for the performance of signal amplification transmitted only in a desired sub channel. For example, current mDR solutions pass down the signal transmitted in the NR FR2 n261 band (27.5-28.35 GHz), i.e. 850 MHz of signal spectrum. However, the signal may occupy only a sub channel (or a number of sub channels in the case of carrier aggregation) of 50/100/200/400 MHz. Sub channelization and signal amplification in the desired channel allows for noise and interference reduction. Also, it prevents the data traffic of other operators also present in this band from being forwarded.

In general, the aspects described herein utilize control information decoding, which allows the IDR to "know" all control information transferred to the UE served to the IDR, and to tune its parameters accordingly for overall performance optimization. An example of such tuning parameters may be the Physical Cell ID (PCI), which is a unique cell identifier. In this case, the IDR knows the traffic of what PCI it re-transmits, in the event that several cells are installed geographically at the same location.

As further discussed herein, the IDR aspects allow for the IDR to remain a transparent solution for a network, as the IDR does not introduce any significant delay. The delay may instead be comparable to the channel propagation delay. At the same time, this allows the IDR to decode the control information used to optimize its performance.

FIG. 1 illustrates an example of a known amplify-and-forward relay architecture 100. Such previous solutions for mmWave Distributed Relay (mDR) perform amplification and forwarding of the signal transmitted in a FR2 n261 sub-band, but have drawbacks. For instance, as part of its ordinary operation, the amplify-and-forward relay architecture 100 may forward noise and interference during silent TDD periods, which has negative impact on overall system performance. The amplify-and-forward relay as shown in FIG. 1 also lacks synchronization, and thus forwards any signal that is present at its input, which may include noise. Moreover, the amplify-and-forward relay of FIG. 1 lacks power control functionality, and as a result amplification is set to a constant gain value. Further, the amplify-and-forward relay architecture 100 performs beamforming based on the power measurements at the intermediate frequency, with the best sector being selected based on that metric. For example, a signal present in the entire n261 band, i.e. 850 MHz of signal bandwidth, may be forwarded. The amplify-and-forward relay of FIG. 1 is also unaware of basic control parameters of transmission used in a particular cell.

The amplify-and-forward relay architecture 100 may be implemented as a mmWave Distributed Relay (mDR) system and be structurally divided into three units, including a DL amplify-and-forward branch 102A (shown on the top), control circuitry 104 (shown in the middle), and an UL amplify-and-forward branch 102B (shown in the bottom). The downlink and uplink branches 102A/102B have identical structures, and differ only in the direction of signal re-transmission (from base station (BS) to user equipment (UE, i.e. one or more devices served by the BS) or from UE to BS). Each downlink/uplink unit has an access and donor side, in which the access side provides access for a number of UEs (forming an access cell) and connects them to the BS using the donor side of the amplify-and-forward relay architecture 100.

The mDR system is designed to support both Time Division Duplex (TDD) and Frequency Division Duplex (FDD) modes of operation. However, the mDR normally operates in the TDD mode, so only one of the units (downlink or uplink) receives and re-transmits the signal at the time.

Each downlink/uplink amplify-and-forward branch 102A/102B is also equipped with two planar phased antenna arrays of 4×4 geometry used for signal transmission and reception. The single antenna element has dual polarization (co-located vertical and horizontal polarization), i.e. each array has 16 V-pol and 16 H-pol elements.

Four Radio Frequency Integrated Circuits (RFIC), noted as RFIC #0, #1, #2, and #3, are used to demodulate and receive the signal from one array, and then modulate and feed the other array for transmission. The demodulation and modulation is performed from the Radio Frequency (RF) from the range 27.5-28.35 GHz, i.e. 850 MHz of signal spectrum, to the Intermediate Frequency (IF) of 10.56 GHz. Signal processing is performed at the IF frequency before the signal is being re-transmitted.

Each RFIC #0, #1, #2, and #3 is connected to the sub-array of 2×4 elements, i.e. two RFICs are required for V-pol and H-pol operation, and four circuits are used in total. The signal branches for V-pol and H-pol are processed separately and highlighted by blue and green color in FIG. 1, respectively. The operation of the DL amplify-and-forward branch 102A is described in further detail, assuming that the UL branch 102B has a similar or identical configuration and thus operated in a similar or identical manner.

At the donor side, the signals obtained from RFIC #0 and #2 for V-pol (denoted as V-RX in FIG. 1) are combined/mixed using V-Comb device. The signals obtained from RFIC #1 and #3 for H-pol (denoted as H-RX in FIG. 1) are combined/mixed using the H-Comb device. The V-RX/H-RX signal is amplified using a Low Noise Amplifier (LNA), and then transferred from the donor side to the access side.

At the access side, the signals for V and H branches are amplified using another LNA, and then each of the V-TX and H-TX signals are divided equally between the two RFICs #0, #2 and #1, #3, respectively.

The amplify-and-forward relay architecture 100 is also equipped with several power meters, which measure the RF signal power and transfers the control voltage to the control circuitry 104 of a board or other suitable component, which may form part of the amplify-and-forward relay architecture 100. Based on these power measurements, the optimal beamforming Antenna Weight Vectors (AWVs) for the donor side are installed. Note that at the access side, the phased antenna arrays have an omni-directional pattern; however, at the donor side, the phased antenna arrays have essentially directional patterns steered to the BS spatial direction. The latter is caused by the fact that UEs are mobile in nature, and in contrast the BS and mDR have static locations. Therefore, in such a configuration, the directional tracking of the devices it not required, which simplifies implementation.

The RX AWV for the donor side is selected from a predefined codebook using the best receive RF power measurement. The TX AWV for the donor side is selected to be identical to the TX AWV, assuming the reciprocity between the TX and RX chains. Finally, note that control function in the current mDR implementation is performed based on the RF power measurement only, which is quite inertial in time (~100 ms), and is not enough for accurate TDD management. Therefore, in the current implementation, both DL and UL amplify-and-forward branch 102A/102B are always switched on and re-transmit the received signal (including noise and interference), continuously.

Figure 2:
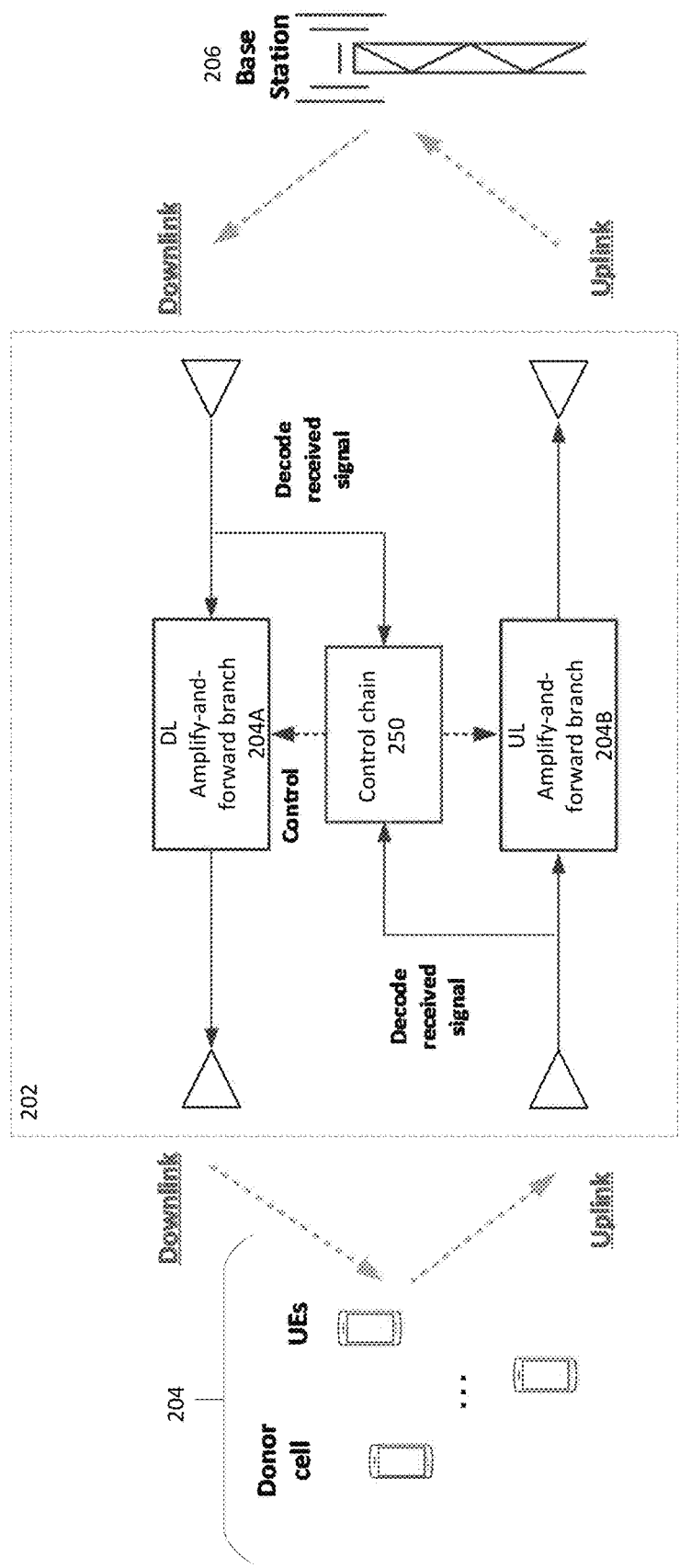
FIG. 2 illustrates an example block diagram of an intelligent distributed relay (IDR) system, in accordance with an aspect of the disclosure.

FIG. 2 illustrates an example block diagram of an intelligent distributed relay (IDR) system, in accordance with an aspect of the disclosure. The IDR system 200 includes the IDR 202, several UEs 204, and a base station 206. The aspects of the IDR 202 as further described herein (which again may be used, for example, at mmWave frequencies (mIDR)), also provide an amplify-and-forward solution similar to the mDR of the amplify-and-forward relay architecture 100 as shown in FIG. 1. However, the IDR 202 advantageously implements control chain circuitry 250, which can receive and decode signals. For instance, and as further discussed below, the control chain circuitry 250 may be implemented as a custom or programmable DSP and corresponding control circuitry. Alternatively, and as discussed herein, the control chain circuitry 250 may be implemented as a UE or portions of a UE. In any event, the control chain circuitry 250 may be configured to decode the synchronization signal block (SSB) of signals transmitted by the BS.

The information decoded from the SSB in this manner may then be used, in accordance with the various aspects described herein, to introduce various "intelligent" control of the relay as further discussed herein. For instance, and as noted above by way of example and not limitation, the IDR aspects as discussed herein introduce control functions such as synchronization, power control, beamforming, sub channelization, control information extraction, etc. These intelligent control functions allow for an improvement in performance, as the IDR includes an amplify-and-forward solution, but does not introduce significant delay, as the delay that is introduced may be considered as a part of the channel delay. Therefore, from a network perspective, the IDR 202 is a "transparent" solution, and does not introduce additional complexity as in a typical decode-and-forward case.

With continued reference to FIG. 2, the general block diagram of the IDR 202 is similar in structure to the conventional mDR solution as shown and described herein with respect to FIG. 1. In fact, and as further discussed below, the IDR 202 may perform the same functions as the amplify-and-forward relay architecture 100 as shown in FIG. 1, with a DL amplify-and-forward branch 204A and a UL amplify-and-forward branch 204B providing for downlink and uplink retransmission, respectively. The IDR 202 also has a DSP control circuitry 206, which can be implemented as re-use of UE device or as a custom DSP, as discussed herein, in various aspects. Regardless of the particular implementation, the DSP control circuitry 206 may be configured to perform any suitable type of digital signal processing operations, and is configured to receive and decode signals. Based on the decoded information, the DSP control circuitry 206 may control amplify-and-forward devices in the downlink and/or uplink branches.

Figure 3:
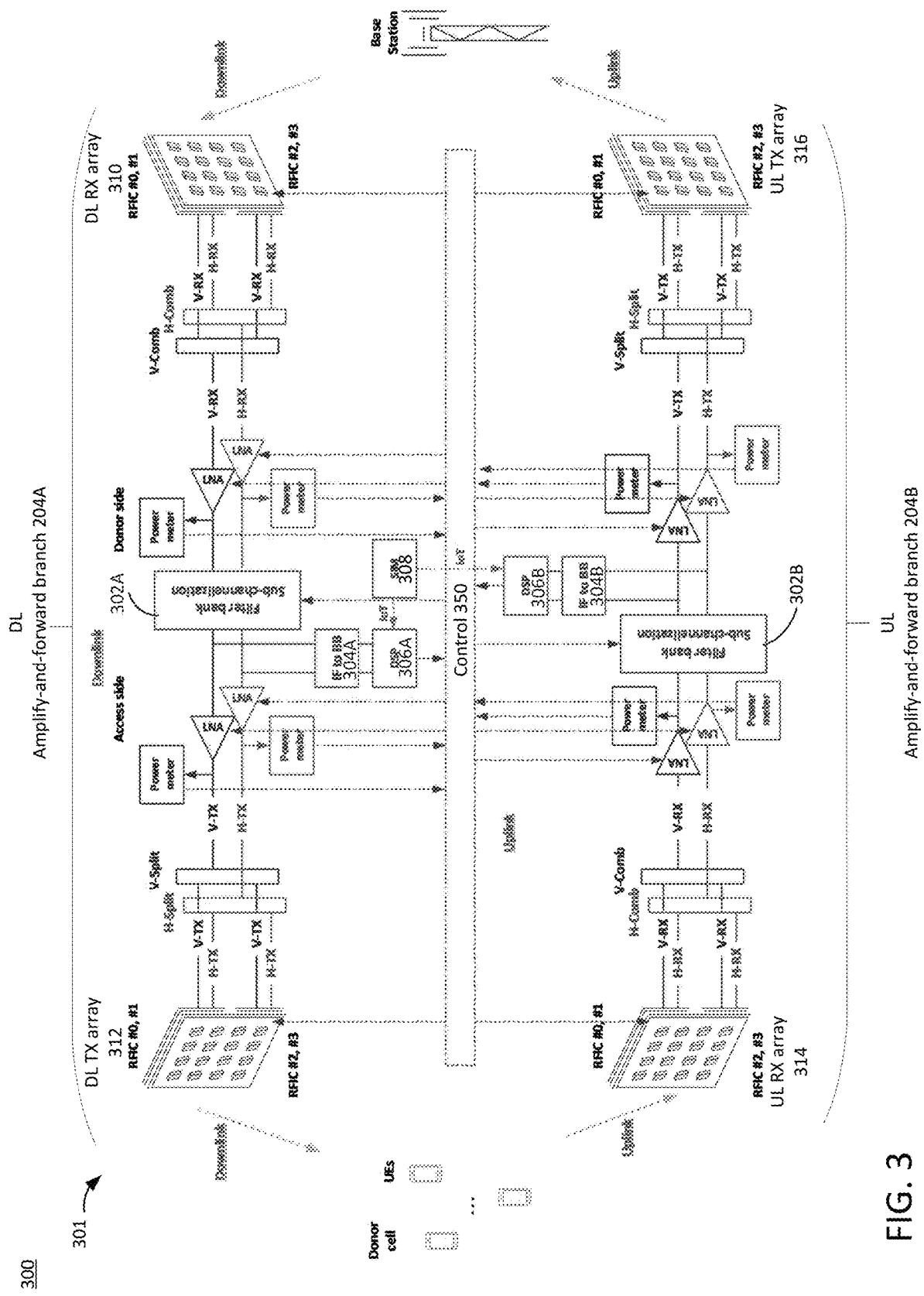
FIG. 3 illustrates an example block diagram showing additional detail of the IDR system 200 as shown in FIG. 2, in accordance with an aspect of the disclosure.

FIG. 3 illustrates an example block diagram showing additional detail of the IDR system 200 as shown in FIG. 2, in accordance with an aspect of the disclosure. The IDR system 300 includes several components that form the IDR 301, together with the UEs and BS as shown. The IDR 301 may operate in a similar or identical manner as the amplify-and-forward relay architecture 100 of FIG. 1. For instance, the IDR 301 includes a DL amplify-and forward branch 204A and an UL amplify-and forward branch 204B as shown in FIG. 2, which may include components corresponding to those discussed above with respect to the amplify-and-forward branches 102A, 102B, respectively, as shown in FIG. 1. For example, each of the DL amplify-and forward branch 204A and the UL amplify-and forward branch 204B may include V-pol and H-pol splitters and combiners, power meters, LNAs, in both the downlink and uplink branches, respectively, as well as the antenna arrays 310, 312, 314, 316.

Thus, with the exception of the additional control chain components discussed herein, which may be identified with the control chain circuitry 250 of FIG. 2, each of the DL amplify-and-forward branch 204A and the UL amplify-and-forward branch 204B may be implemented with similar or identical components as shown and described above with respect to the DL amplify-and-forward branch 102A and the UL amplify-and-forward branch 102B associated with the amplify-and-forward relay architecture 100 as shown in FIG. 1. However, the aspects described herein are not limited to these examples, and the DL amplify-and-forward branch 204A and the UL amplify-and-forward branch 204B may include additional, alternate, or fewer components than those described with respect to FIG. 1. For instance, the DL amplify-and-forward branch 204A and the UL amplify-and-forward branch 204B may be configured to operate in accordance with any suitable frequency (e.g., other than or including mmWave frequencies as described herein), have antenna arrays 310, 312, 314, 316 of any suitable number of elements, geometry, and/or size, be of a single polarity versus the dual polarity system as shown, etc.

In an aspect, the IDR 301 as shown in FIG. 3 also includes additional components that are identified with the control chain circuitry 250 as shown in FIG. 2, which include the control circuitry 350, RF filter bank sub-channelization circuitry 302A, 302B, intermediate frequency (IF) to base band (BB) downconverters 304A, 304B, DSP circuitry 306A, 306B, and subscriber identify module (SIM) circuitry 308. These components form the control chain circuitry 250 and enable the intelligent control functions as discussed herein, in accordance with various aspects. Thus, these components are the primary focus of the aspects as described herein, as the control chain circuitry differentiates the IDRs 200, 300 from the operation of the conventional amplify-and-forward relay architecture 100 as shown in FIG. 1.

The IDR 301 as shown in FIG. 3 may also include additional, alternate, or less components than those shown in FIG. 3, which are configured to perform the various functionalities of the aspects as described herein. Further, the various components of the control chain circuitry 250 are also provided by way of example and not limitation, which may be implemented as any suitable type of hardware, processors, firmware, software, or any combination of these. This may include, for instance, custom hardware and/or software components or other available components that may be configured, programmed, or otherwise implemented to perform the processing and functional aspects as discussed herein. For instance, the control chain circuitry 250 may form the entirety of or a part of a UE, such as a mobile phone, which may be configured to receive and decode transmissions from the BS and to communicate the extracted and decoded information to the control circuitry 350.

Regardless of the particular components used to implement the control chain circuitry 250, each of these components may be configured to communicate with one another in accordance with any suitable number and type of links and/or communication protocols. For example, the control circuitry 350 may include one or more processing components, communication interfaces, ports, firmware, hardware, software, or combinations thereof. In an aspect, the control chain circuitry 250 may include a non-transitory computer-readable media, such as integrated or external memory, for example, configured to store machine-executable instructions. These instructions may be stored on one component of the control chain circuitry 250 (e.g. the control circuitry 350) or on or across any combination of these components. In an aspect, regardless of the type of computer-readable medium and the instructions stored thereon, execution of these instructions by one of more components in the control chain circuitry 250 (e.g. control circuitry 350, DRP circuitry 306A, 306B, etc.) as discussed herein facilitates the operation of the IDR 301 with respect to the execution of the intelligent control functions.

The control circuitry 350 may be configured to receive power measurement data from each of the power meters as shown in FIG. 3, and to transmit control signals to the LNAs in each of the DL and UL amplify-and-forward branches 204A, 204B to control the gain setting of each respective LNA. Additionally, the control circuitry 350 is configured to receive information extracted from the DSPs 306A, 306B, which may include decoded SSB information as discussed herein. The control circuitry 350 may utilize this decoded information and/or other information that is provided by the DSP circuitry 306A, 306B or provided via the SIM circuitry 308, as further discussed herein, to perform various intelligent control functions.

For instance, the control circuitry 350 may utilize the decoded SSB information to perform control information extraction and synchronization with BS transmissions. This control information may provide various parameters indicative of the communication protocols, type of transmissions, modulation schemes, timing, etc., that define the communications between the base station and the served UEs, which the IDR 301 may then utilize once known to efficiently function as a relay to support such communications between these devices. Additionally, the control circuitry 350 may use the control information to perform power control in the each of the DL and UL amplify-and-forward branches 204A, 204B by controlling the gain of one or more respective LNAs within these branches at appropriate times. Aspects also include the control circuitry 350 additionally or alternatively using the control information to send control signals to the antenna arrays 310, 312, 314, 316 to adjust antenna weights and/or phases in accordance with an appropriate codebook vector value to execute beamforming operations.

Still further, the control circuitry 350 may additionally or alternatively use the control information to send control signals to the RF filter bank sub-channelization circuitry 302A, 302B to perform narrow-banded filtering based upon detected channel conditions. For example, aspects include the RF filter bank sub-channelization circuitry 302A, 302B being configured as any suitable type of digital or analog controllable and/or tunable filter to perform fine IF channel filtering and sub channelization with any suitable center frequency resolution depending upon the particular application, which may include, for instance, 60/120/240 kHz, etc. Additionally or alternatively, the RF filter bank sub-channelization circuitry 302A, 302B may be configured to operate having a channel width of any suitable frequency width, which may also be tunable/adjustable.

For instance, the channel width of the RF filter bank sub-channelization circuitry 302A, 302B may be equal to 50/100/200/400 MHz, etc., applied equally to the entire bandwidth, or configured as several non-contiguous channels, such as in case of carrier aggregation, for example. This allows the implementation of the sub-channelization control function as described herein, which may be dynamically adjusted via the control circuitry 350. The RF filter bank sub-channelization circuitry 302A, 302B may thus operate in accordance with a set of one or more filter tuning parameters, the adjustment of which results in an adjustment to the various parameters noted herein with respect to the filtering operations performed, e.g., notch locations, bandwidth, frequency resolution, frequency width, pole locations, etc.

Thus, the RF filter bank sub-channelization circuitry 302A, 302B are each configured to filter received signals in the DL and UL directions, respectively, and to couple these filtered signals in the IF domain to each respective IF to BB downconverter 304A, 304B. Although not shown in FIG. 3 for purposes of brevity, the downconversion of the signals received via the UL and DL paths may be performed in any suitable manner, which may include a downconversion of received signals of a higher (RF) frequency to IF in a stage (not shown) prior to being coupled to the RF filter bank sub-channelization circuitry 302A, 302B. Alternatively, the DL and UL amplify-and forward branches 204A, 204B may function using a direct downconversion of RF to BB without the use of an IF frequency. For example, the RF filter bank sub-channelization circuitry 302A, 302B may operate in accordance with RF frequencies, and the IF to BB downconverters 304A, 304B may operate alternatively as RF to BB downconverters (e.g. IF=RF).

As shown in FIG. 3, aspects include the IDR 301 re-transmitting received signals in each of the UL and DL branches 204A, 204B in parallel with the coupling of the filtered signals to the IF to BB downconverters 304A, 304B. This architecture allows the IDR 301 to re-transmit signals received in the UDL and UL directions while the components of the control chain circuitry 250 sample data from the signal re-transmissions to perform the various intelligent control functions as discussed herein. For instance, once the control information is extracted by way of this sampling, the control circuitry 350, in conjunction with the other components in the control chain circuitry 250, may facilitate dynamic adjustments to subsequent re-transmissions based upon the particular intelligent control function(s) that is/are implemented.

The IF to BB downconverter 304A and/or 304B may be configured as any suitable type of components configured to provide downconversion from the IF to BB and to perform signal demodulation in accordance with any suitable type and number of communication protocols, and over any suitable frequency range. For example, the IF to BB downconverter 304A and/or 304B may be configured to perform signal demodulation of signals from the IF 10.56 GHz to the zeroth BB frequency. The demodulation for V-pol and H-pol branches may be performed in parallel (e.g., concurrently).

As mentioned above, the DSP circuitry 306A and/or 306B may be implemented not only with hardware components, but also using firmware components realized via hardware processor(s) and/or real time system operation. The DSP circuitry 306A and/or 306B may be configured to perform signal digitization using Analog to Digital Conversion (ADC) and to provide the control circuitry 350 with information to realize the intelligent control functions as discussed herein. Each of these intelligent control functions are discussed further below in greater detail.

To do so, aspects include each DSP circuitry 306A, 306B being coupled to the SIM circuitry 308 via any suitable interface, such as an Internet of Things (IoT) interface for example, which may constitute a communication link between the each respective DSP circuitry 306A, 306B and the SIM circuitry 308. This communication link may support any suitable number and/or type of interface or protocol to facilitate communication between the DSP circuitry 306A, 306B and the SIM circuitry 308. The SIM circuitry 308 may function in conjunction with any suitable type of SIM card, which may enable the IDR 301 to connect to the network associated with the BS and UEs and to decode information received via the base station transmissions using the DL branch as shown in FIG. 3 and further discussed below. The SIM circuitry 308 thus provides decoded information received via the DL and UL amplify-and-forward branches 204A, 204B as shown in FIG. 3 to the DSP circuitry 306A, 306B within each of the DL and UL branches, respectively. Again, this decoded information may be, for example, control information extracted from BS transmissions, a current TDD pattern, beamforming information, etc., as further discussed below.

Synchronization and Control Information Extraction

In an aspect, the synchronization control function allows the IDR 301 to acquire digital synchronization with base station transmissions by receiving a Synchronization Signal Block (SSB) transmission from the base station. Aspects include the synchronization function being performed in parallel (e.g. concurrently) with the re-transmission of the BS signals to the UEs in the downlink path. In other words, the IDR 301 may sample signals transmitted by the BS while amplifying and forwarding these signals to the UEs using the DL amplify-and-forward branch 204A. The DSP circuitry 306A may then use these sampled signals to extract the control information, which is provided to the control circuitry 350 to dynamically adjust the operation of the IDR 301 in various ways using the intelligent control functions as discussed herein, in various aspects. In this way, the IDR 301 may initially operate in a manner that is similar to conventional amplify-and-forward relays, such as conventional amplify-and-forward relay architecture 100 as shown in FIG. 1 as discussed herein. Then, once the control information is extracted from the sampled BS transmissions, the IDR 301 may use this information to perform the various intelligent control functions with respect to subsequent re-transmission of signals transmitted from the base station after the control information is extracted, thereby improving performance.

Further to this point, although the aspects described herein are with respect the IDR 301 performing such intelligent control functions, IDR 301 may operate in other modes. In other words, the IDR 301 may operate in a "smart" or "enhanced" mode to perform the various intelligent control functions such as synchronization, power control, beamforming, sub channelization, control information extraction, etc. However, the IDR 301 may dynamically switch between this enhanced mode and a "standard" mode of operation to provide only conventional amplify-and-forward operation without the added intelligent functions as noted herein, such as operation as an mDR as known in the art or the conventional amplify-and-forward relay architecture 100 as shown in FIG. 1, for instance.

The ability to switch between an enhanced and standard mode of operation allows the IDR 301 to ensure backward compatibility with legacy systems. That is, the IDR 301 has backward compatibility with other legacy devices in the sense that the IDR 301 can operate in a fully compatible DR mode (or mDR mode, as the case may be). In such a case, all measurements are performed in the analog domain and require more time than if done in the digital domain (e.g. via the DSP circuitry 306A/306B and/or the control circuitry 350). For example, power measurements performed in the analog domain via an RMS detector require ~100 us to complete a single measurement. In contrast, the digital implementation of a power measurement only requires on the order of ~10 us for measurement completion. Thus, it is advantageous for the IDR 301 to operate in an enhanced mode of operation when possible to ensure that adequate overhead is attained to facilitate reaction time to adapt to changing channel conditions and to increase responsiveness in operation.

Again, once extracted, the IDR 301 may use the control information to perform the various intelligent control functions, thereby improving performance. This may include, for instance, using a Time Division Duplex (TDD) pattern to manage the downlink (DL) and uplink (UL) transmissions. In this way, UL signal retransmissions may be prevented during time intervals in which only the DL signal is transmitted, and also prevents DL signal retransmissions during time intervals in which only the UL signal is transmitted. Thus, the aspects described herein facilitate the IDR 301 reducing the amount of noise and interference that may otherwise be amplified and transmitted in both the DL and UL directions.

To provide additional clarity, a discussion regarding the structure and usage of SSB transmissions is warranted. It is noted, however, that the specific timing, frame length, and/or other metrics used in the following explanation are provided by way of example and not limitation. The aspects described herein may be adapted to other protocols that may have different frame lengths, string sizes, transmission periods, be transmitted in accordance with variations from these examples, using other types of protocols, etc.

Figure 4:
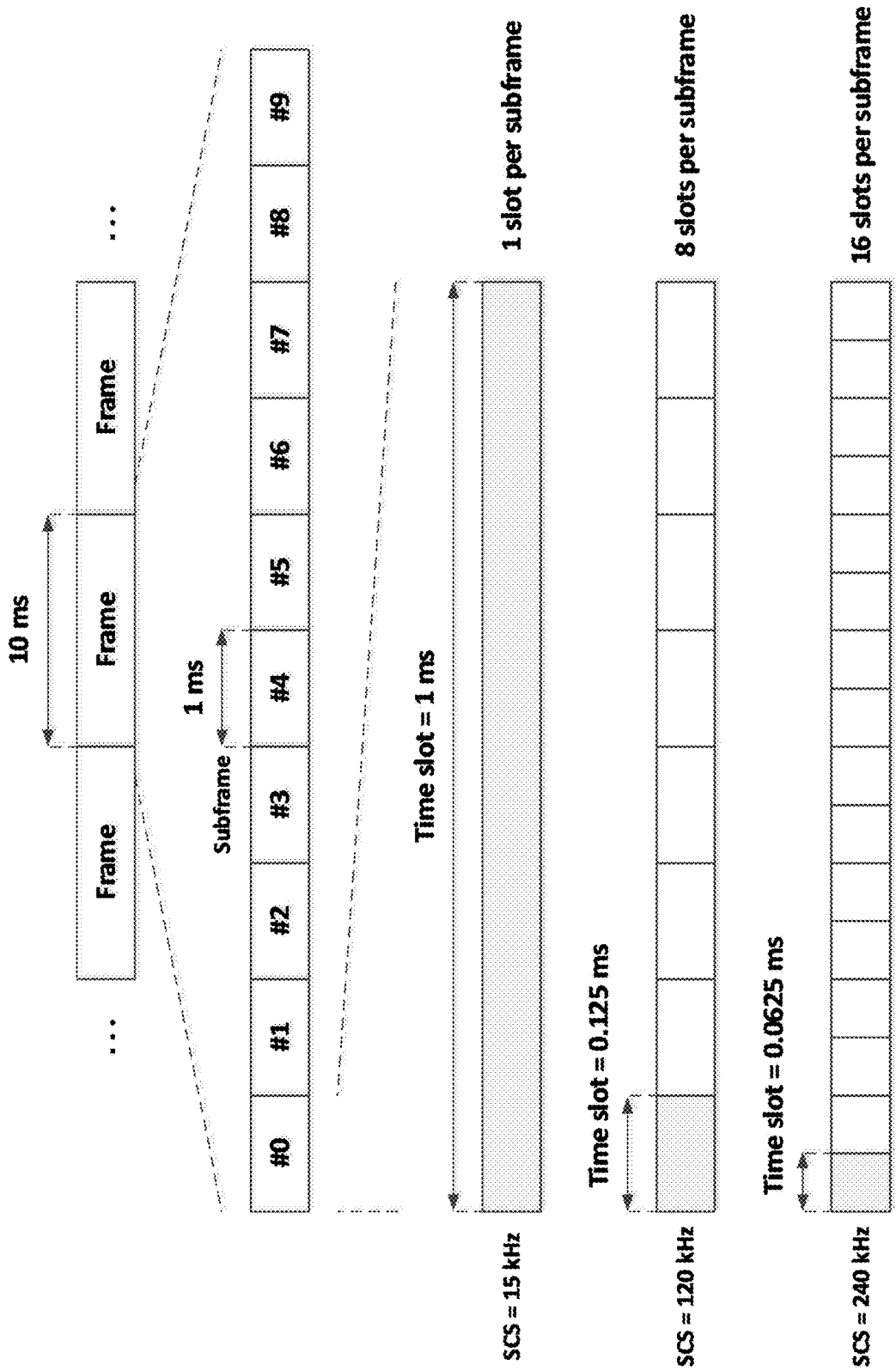
FIG. 4 illustrates frame, sub-frame, and time slot timing associated with base station transmissions, in accordance with one or more aspects of the present disclosure.

In accordance with known techniques, a BS periodically transmits a frame typically having a 10 millisecond (ms) duration. Each frame has its own System Frame Number (SFN), which is defined within a range from 0 to 1023. Furthermore, each frame time interval is divided into 10 sub-frames of 1 ms duration. In turn, a sub-frame includes several time slots, and the number of these time slots depends on the Subcarrier Spacing (SCS). An example of the relationship among a transmitted frame, sub-frame, and accompanying time slots is shown in FIG. 4. In particular, FIG. 4 illustrates different partitioning of sub-frames into various numbers of time slots for example SCS of 15 kHz, 120 kHz, and 240 kHz. Thus, and with continued reference to FIG. 4, it is noted that for the example SCS of 15 kHz that the duration of the sub-frame and the time slot are identical. However, for the examples in which the SCS is equal to 120 kHz and 240 kHz, the sub-frame consists of 8 and 16 time slots, respectively. Therefore, the duration of time slots per sub-frame decreases while the number of time slots per sub-frame increases with increasing SCS frequencies. However, each time slot further includes, in this example, 14 orthogonal frequency-division multiplexing (OFDM) symbols. The number of OFDM symbols per time slot is constant and does not depend on the SCS frequency.

Figure 5:
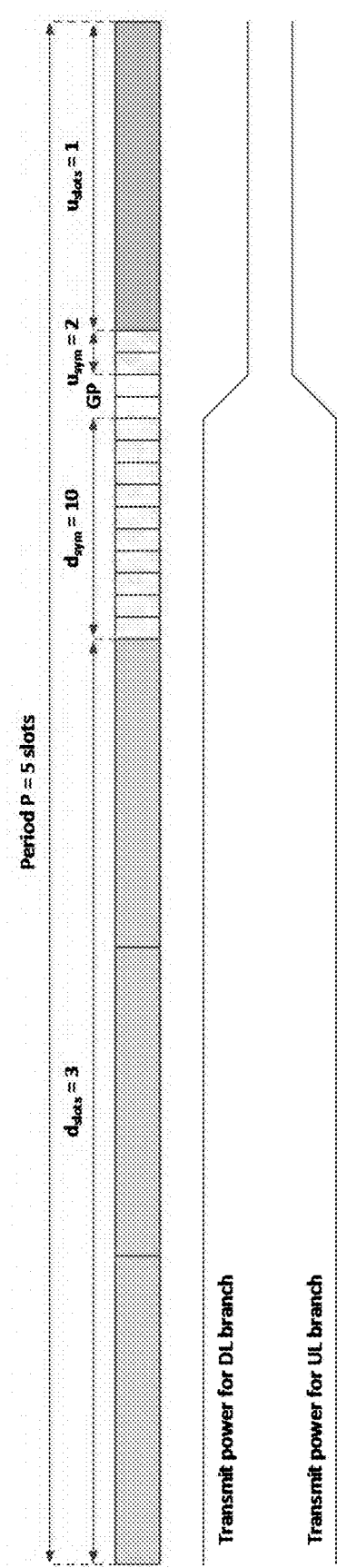
FIG. 5 illustrates an example of time-division duplex (TDD) pattern and transmit power management implemented by the IDR, in accordance with on e or more aspects of the present disclosure.

Thus, a Time Division Duplex (TDD) pattern is defined in terms of the time slots and OFDM symbols allocated for the DL transmission, which are typically denoted as $d_{slots}$ and $d_{sym}$, respectively. Moreover, the number of time slots and OFDM symbols allocated for the UL transmission denoted as $u_{slots}$ and $u_{sym}$, respectively. The TDD pattern has a period P, which is equal to the total number of time slots. An example of such a TDD pattern is shown in FIG. 5. In this example, P=5 slots, $d^{slots}=3$, $d_{sym}=10$, $u_{slots}=1$, and $u_{sym}=2$.

The remainder of the OFDM symbols, which are not allocated for DL or UL, are defined as "flexible" symbols. These flexible symbols are used to define a Guard Period (GP), which is used as a transition period to switch from the DL to UL and back from the UL to DL. The guard period is also used to handle the propagation time delay between the BS and (UE.

As shown in FIG. 5, aspects include the IDR 301 performing transmit power management based on the TDD DL and UL transmissions. In particular, this may be implemented, for instance, via the control circuitry 350 controlling the gain adjustment of the LNAs in the DL and UL amplify-and-forward branches 204A, 204B that precede the DL TX array 312 and the UL TX array 316, as the case may be. The control circuitry 350 may adjust the transmit power in this manner in each of the DL and UL directions during the aforementioned guard period, as shown in FIG. 5. For instance, during a time corresponding to the DL time slots and OFDM symbols, the transmit power for the DL branch 204A is high and for the UL branch 204B is low. In contrast, during a time corresponding to the UL time slots and OFDM symbols, the transmit power is low for the DL branch 204A and high for the UL branch 204B. In an aspect, FIG. 5 shows an example of UL and DL power management in a scenario in which DL transmissions and UL transmissions are assumed to occur. However, it is noted that although the IDR 301 receives the signals in the UL and DL directions, these received signals are not necessarily retransmitted. In other words, aspects include the IDR 301 selectively retransmitting signals received via a DL or UL path, with FIG. 5 assuming such retransmissions are occurring in this scenario for ease of explanation.

Referring now back to FIG. 4, a TDD pattern starts at the beginning of the first frame with index 0, and the frame is then periodically repeated in time. This TDD pattern is static, i.e. its parameters are not frequently changed. Turning now to FIG. 3, in an aspect the DSP circuitry 306A, 306B each receive the TDD pattern parameters through the IoT interface from the SIM circuitry 308 that is integrated into the IDR 301. In an aspect, the SIM circuitry 308 may be integrated as part of the IDR 301 and configured as any suitable type of circuit, hardware components, software components, etc. (e.g. known SIM card interface circuitry) configured to interface and/or communicate with any suitable type of SIM card or other suitable type of hardware that performs association with the target BS and acquires the TDD pattern parameters, which are then transferred to the IDR system 300 and, in particular, the DSP circuitry 306A, 306B via each respective IoT interface. As an example, the TDD pattern parameters that may be transferred in this manner may include the TDD pattern period (P), the number of DL slots ($d_{slots}$), the number of DL OFDM symbols ($d_{sym}$), the number of UL slots ($u_{slots}$), and the number of UL OFDM symbols ($u_{sym}$). Once the TDD pattern parameters are received, aspects include the DSP circuitry 306A, 306B and/or the control circuitry 350 calculating the number of GP OFDM symbols as follows:

$$NGP=P*14-(d_{slots}+u_{slots})*14-(d_{sym}+u_{sym})$$

To acquire synchronization and to find the beginning of the frame, and then in turn the TDD pattern, the DSP circuitry 306A, 306B and/or the control circuitry 350 uses Synchronization Signal Blocks (SSBs), which are transmitted by the BS using different beamforming sectors. The SSB consists of the four OFDM symbols, and the positions of the zeroth symbol for each block are known. The positions are also dependent on the SCS parameter, i.e. the positions are predetermined in accordance with the SCS parameters, which are defined as follows:

SCS=120 kHz:

OFDM symbol indexes: {4, 8, 16, 20}+28*n, n=0, 1, 2, 3, 5, 6, 7, 8, 10, 11, 12, 13, 15, 16, 17, 18

SCS=240 kHz:

OFDM symbol indexes: {8, 12, 16, 20, 32, 36, 40, 44}+56*n, n=0, 1, 2, 3, 5, 6, 7, 8

In an aspect, the positions of the SSB may be counted from the beginning of the frame. For example, from the zeroth subframe as shown in FIG. 4 or from the half of the frame (i.e. the fifth subframe). This is signaled by the Half Radio Frame (HRF) bit as further discussed below. The transmission of SSBs is periodical with a minimum (and default) period equal to 20 ms. The zeroth OFDM symbol is modulated by the Primary Synchronization Sequence (PSS), and the second symbol is modulated by the Secondary Synchronization Sequence (SSS). The first and the third symbols are modulated by the symbols of the Physical Broad Cast Channel (PBCH).

Figure 6:
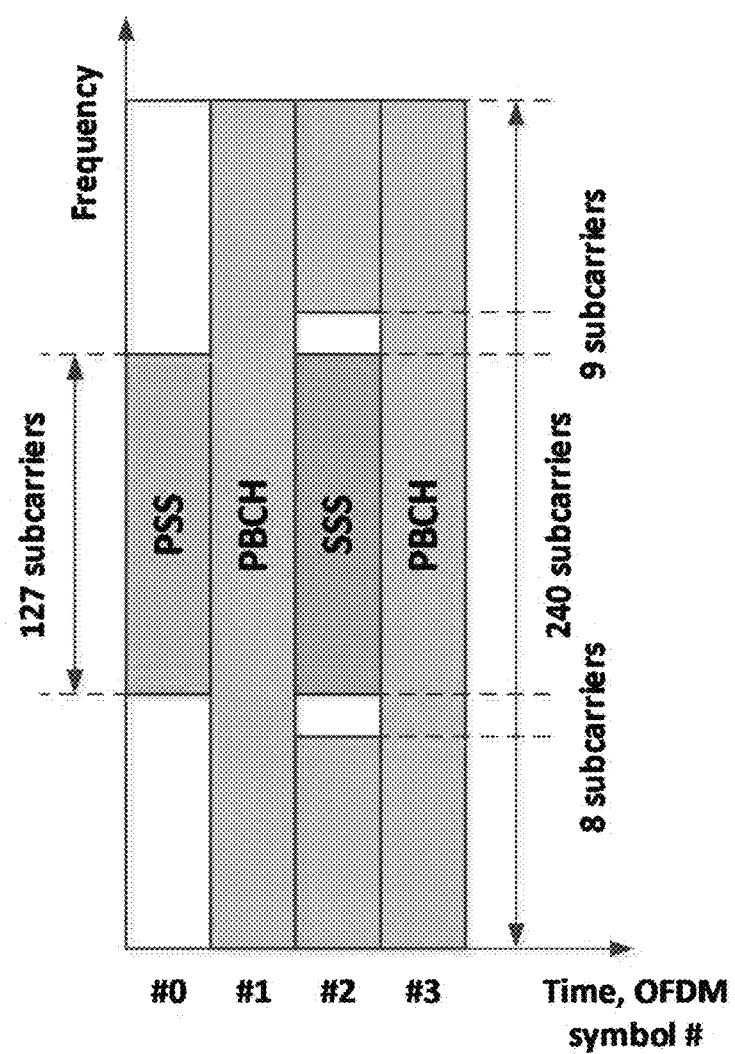
FIG. 6 illustrates an example of synchronization signal block structure (SSB) associated with base station transmissions, in accordance with one or more aspects of the present disclosure.

FIG. 6 shows an example structure of the SSB in greater detail. The SSB location in the frequency domain is defined by the Global Synchronization Channel Number (GSCN), which is set up as follows:

FR2: GSCN=22256+N, N=0:4383, range: 22256-26639

FR2: $F_{SSB}$=24250.08+N*17.28, [MHz]

The PSS occupies the 127 subcarriers in the middle of the signal spectrum of symbol #0, and the rest of subcarriers are set to zero and constitute the guard bands. The SSS occupies the 127 subcarriers in the middle of the signal spectrum of symbol #2. The SSS is separated from the PBCH payload by the guard bands of 9 and 8 zero subcarriers. The PBCH occupies the 240 subcarriers of the symbol #1 and #3 and the rest of subcarriers in the symbol #2, excluding the subcarriers occupied by SSS and guard bands.

Both the PSS and the SSS are modulated using Binary Phase Shift Keying (BPSK) modulation.

The PBCH payload part is modulated by applying Quadrature Phase Shift Keying (QPSK) modulation, and the PBCH is encoded using Polar code. Each cell or Base Station (BS) has its own unique identifier called Physical Cell identifier (PCI), which is used to encode the sequences of SSB. The PCI denoted as $N_{ID}^{cell}$ is composed of two parts as follows:

$$N_{ID}^{cell}=3*N_{ID}^{(1)}N_{ID}^{(2)}$$

$N_{ID}^{(1)}$=0, 1, . . . , or 335

$N_{ID}^{(2)}$=0, 1, or 2

Figure 7:
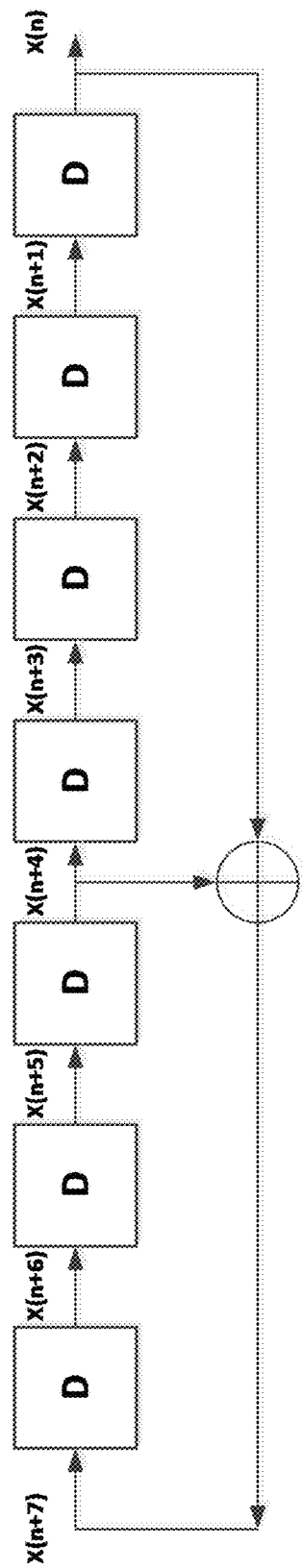
FIG. 7 illustrates an example block diagram of a random signal generator used to generate a primary synchronization sequence (PSS) within the transmitted SSB, in accordance with one or more aspects of the present disclosure.

There are in total 3*336=1008 unique cell identifiers available. $N_{ID}^{(2)}$ is encoded in the PSS transmission and $N_{ID}^{(1)}$ is encoded in the SSS transmission. The Primary Synchronization Sequences (PSSs) are defined in the standard [TS 38.211] using a random number generator, an example of which is shown in FIG. 7 to clarify the operation of the IDR 301 in accordance with the use of these standards. As shown in FIG. 7, the random number generator generates the basic random number X(n) is generated with an initial seed value as shown.

The cell identifier $N_{ID}^{(2)}$=0, 1, or 2 defines the cyclic shift for the X(n) sequence to obtain three PSSs:

$$X_i(n)=X(\mathrm{mod}(n+i*43,127)), i=N_{ID}^{(2)}$$

Then, random sequence is modulated by BPSK as follows:

$$d_{PSS}(n)=1-2*X_i(n), i=N_{ID}^{(2)}$$

Figure 8:
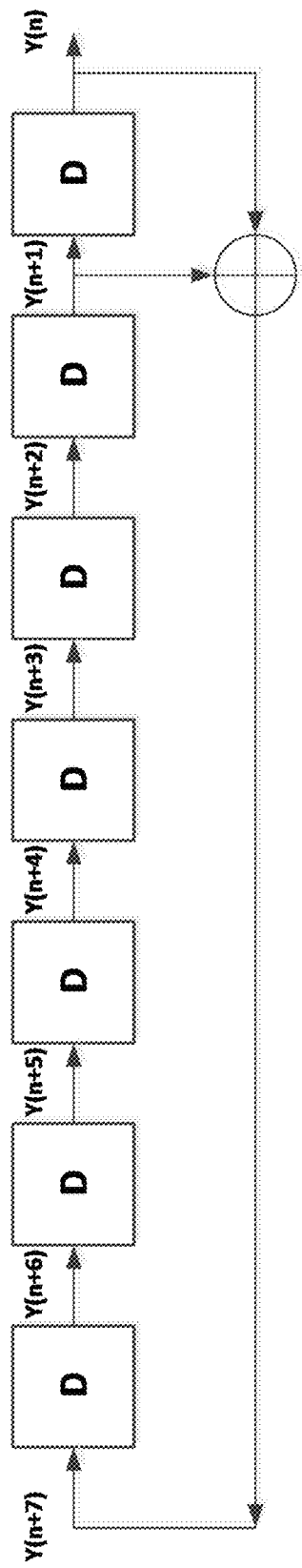
FIG. 8 illustrates an example block diagram of a random signal generator used to generate a secondary synchronization sequence (SSS) within the transmitted SSB, in accordance with one or more aspects of the present disclosure.

The Secondary Synchronization Sequence (SSS) is defined in the standard [TS 38.211] using a random generator, an example of which is shown in FIGS. 7 and 8. Specifically, the SSS is generated using two generators, one for the X sequence as shown in FIG. 7, and another for the Y sequence as shown in FIG. 8. Both generators are initialized with the seed values [0 0 0 0 0 0 1].

The SSS is modulated as follows:

$$d_{SSS}(n)=(1-2*X(\mathrm{mod}(n+m_0,127)))*(1-2*Y(\mathrm{mod}(n+m_1,127)))$$

$m_0=5*(3*\mathrm{floor}(N_{ID}^{(1)}/112)+N_{ID}^{(2)})$ $m_1=\mathrm{mod}(N_{ID}^{(1)},112)$ The PBCH contains a master Information Block (MIB), which includes the system information advertised in the network by BS. The MIB of size 24 bits includes the bits shown in Table 1 below in accordance with the standard [TS 38.331, 6.2.2]. The complete description of each field can be found in the standard at [TS 38.331].

TABLE 1

| Fields | Possible values |
|---|---|
| systemFrameNumber | BIT STRING (SIZE (6)) |
| subCarrierSpacingCommon | ENUMERATED {scs15or60, scs30or120} |
| ssb-SubcarrierOffset | INTEGER (0 . . . 15) |
| dmrs-TypeA-Position | ENUMERATED {pos2, pos3} |
| pdcch-ConfigSIB1 | PDCCH-ConfigSIB1 |
| cellBarred | ENUMERATED {barred, notBarred} |
| intraFreqReselection | ENUMERATED {allowed, notAllowed} |
| Spare | BIT STRING (SIZE (1)) |

Figure 9:
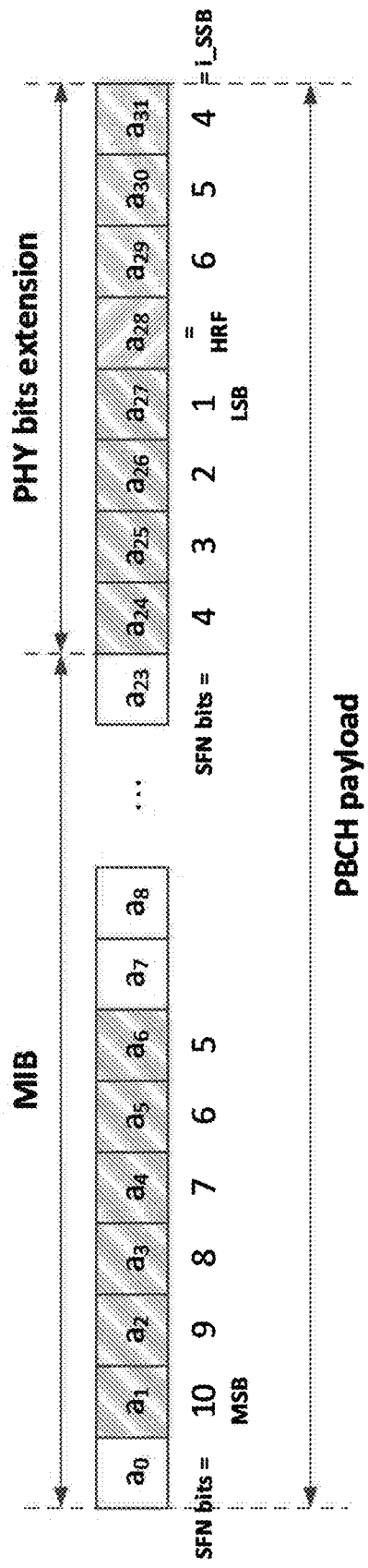
FIG. 9 illustrates an example of Physical Broadcast Channel (PCBH) payload bit content included within the transmitted SSB, in accordance with one or more aspects of the present disclosure.

Except for the MIB, the PBCH payload is appended with the PHY bits extension in accordance with the standard as defined by [TS 38.212, 7.1.1]. An example of the PBCH payload bit content is shown in FIG. 9, and includes the following bits:

MIB: $(a_0, a_1, \ldots, a_{A-1})$, A=24 bits.

PHY bits extension:

$(a_A, a_{A+1}, a_{A+2}, a_{A+3})$ are the $4^{th}$, $3^{rd}$, $2^{nd}$, and $1^{st}$ LSB of System Frame Number (SFN).

$a_{A+4}$ is the Half Radio Frame (HRF) bit.

$(a_{A+5}, a_{A+6}, a_{A+7})$ are the $6^{th}$, $5^{th}$, and $4^{th}$ bits of SSB block index.

The PHY bits extension includes 8 bits, and therefore the total PBCH size is equal to 32 bits.

Figure 10:
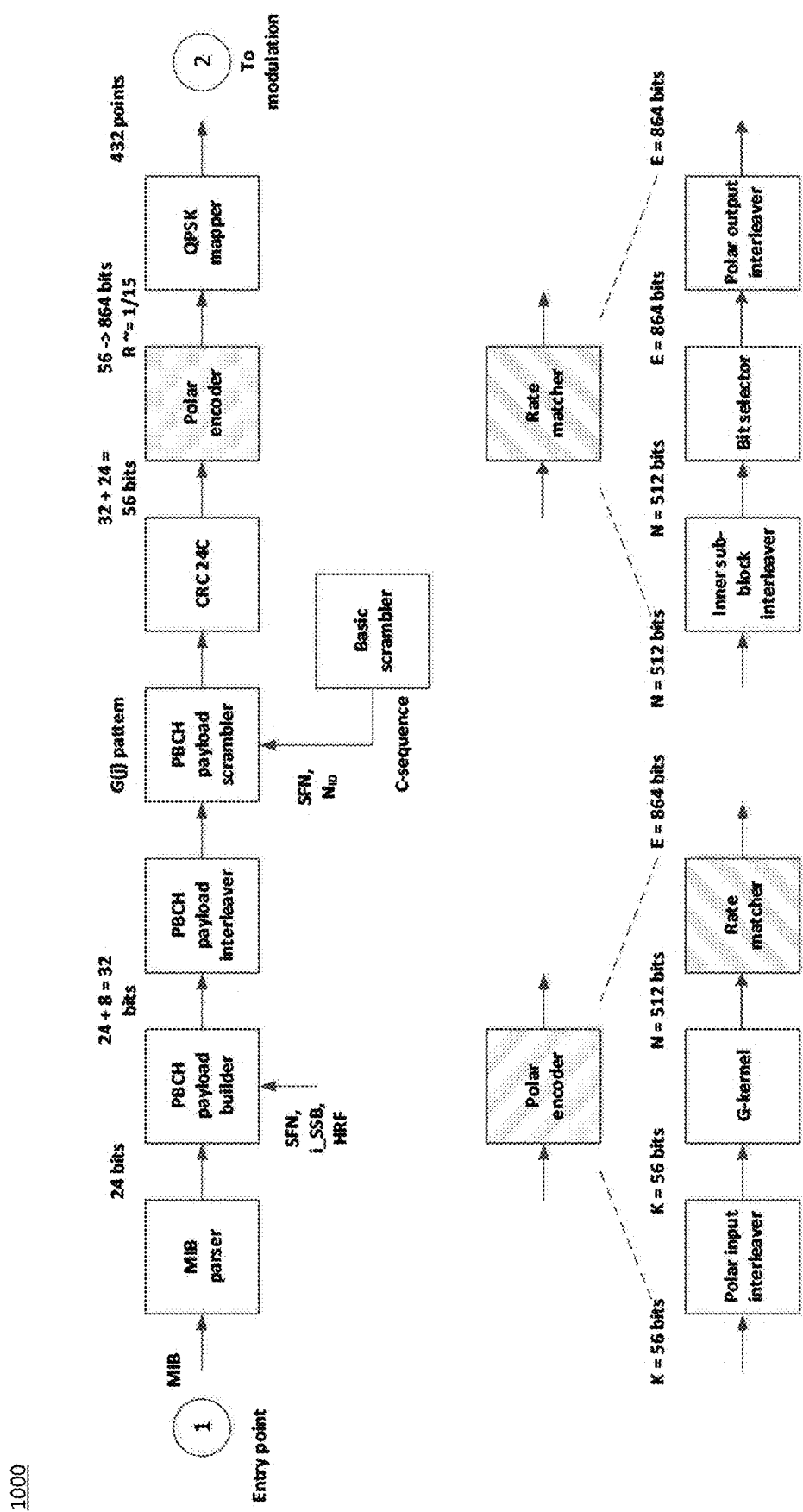
FIG. 10 illustrates an example block diagram of encoding and modulation of the PBCH included within the transmitted SSB, in accordance with one or more aspects of the present disclosure.

Note that the MIB includes 6 MSB bits of the System Frame Number (SFN), and its 4 LSB bits are transmitted as a part of the PHY bits extension. The MIB also includes the Half Radio Frame (HRF) bit and 3 MSB bits of the SSB time index. The 3 LSB bits of the SSB time index are encoded in the Demodulation Reference Signal (DM-RS) as described below The PBCH bit content is scrambled, interleaved, encoded by Polar code, and then modulated using QPSK modulation, an example of which being shown in FIG. 10. The complete description of this process may be found in the relevant standard.

The modulation of the SSB is performed in the frequency domain with subcarrier indexes k=0, 1, . . . , 239. The subcarrier indexes for the PSS, the SSS, and the PBCH are provided in Table 2 below.

In an aspect, the IDR 301 performs synchronization via use of the matched filtering of the PSS sequence in the digital domain, which may be performed via the DSP circuitry 306A/306B and/or the control circuitry 350. It is noted that the PSS is transmitted as part of the SSB block by the BS and not the UE. However, aspects include each of the downlink and uplink branches 204A/204B including respective DSP circuitry 306A/306B for flexibility in implementation. For instance, aspects include the donor cell associated with the UEs alternatively operating as another BS or another IDR 301, and thus DSP circuitry 306B may perform synchronization in such cases in the uplink direction.

Figure 11:
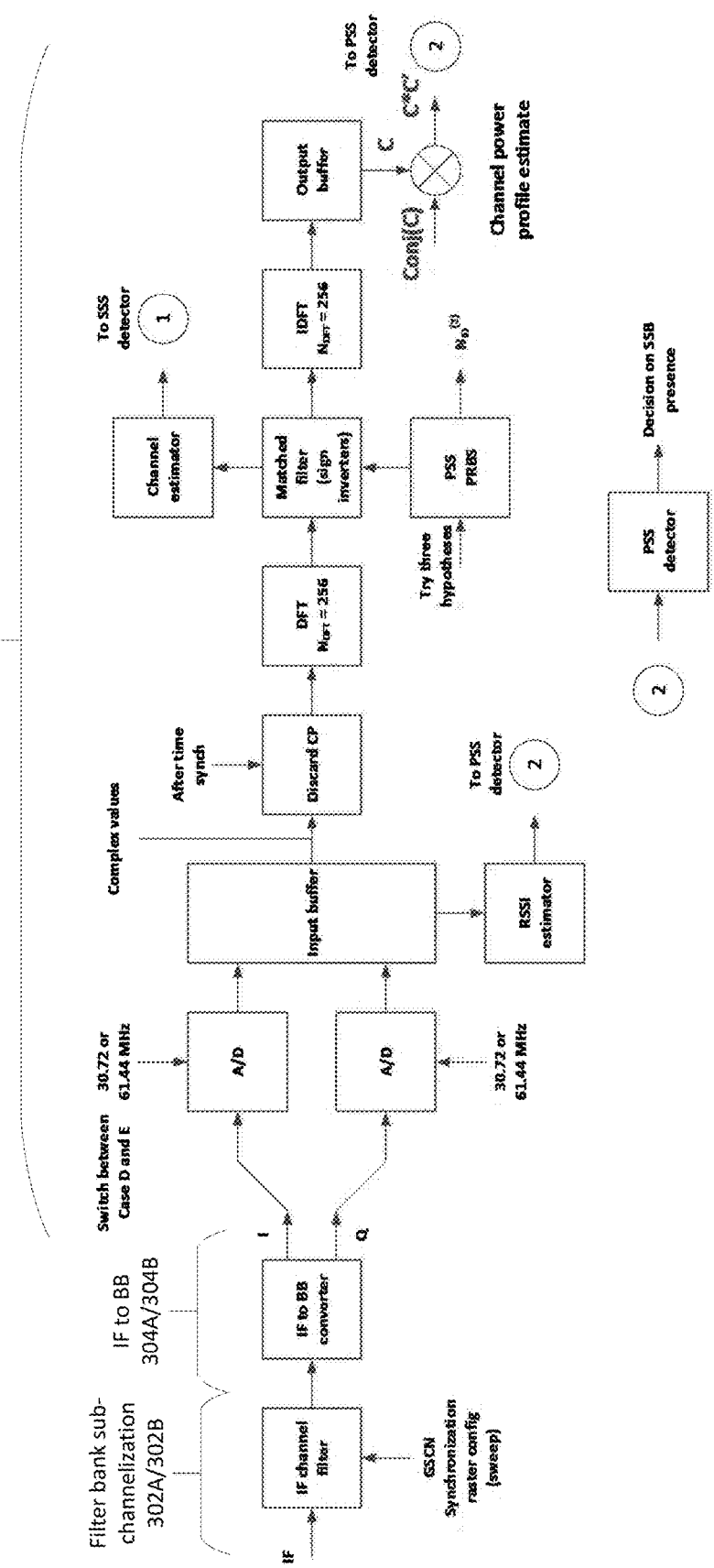
FIG. 11 illustrates an example block diagram of a hardware PSS matched filter and detector implemented by the IDR, in accordance with one or more aspects of the present disclosure.

In an aspect, the RF filter bank sub-channelization circuitry 302A/302B is represented in FIG. 11 as the IF channel filter block, which provides filtered signals in the IF domain to the IF to BB downconverters 304A/304B. Thus, the RF filter bank sub-channelization circuitry 302A/302B provides filtered IF analog signals to the IF to BB downconverters 304A/304B, which downconverts the signals from IF to BB to generate analog in-phase (I) and quadrature phase (Q) analog signals in the baseband domain. These I and Q baseband signals are provided to a set of A/D converters as shown, which are digitalized as digital data streams and coupled to the DSP circuitry 306A/306B via the A/D converters as shown and provided to the input buffer.

This architecture thus facilitates the detection of the PSS and the SSS in accordance with a hardware PSS matched

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, . . . , 236 + v |
|  | 2 | 0 + v, 4 + v, . . . , 44 + v, 192 + v, 196 + v, . . . , 236 + v |

The PBCH QPSK symbols are mixed with the Demodulation Reference Signals (DM-RSs), which subcarrier indexes are dependent on the parameter $v = \mod(N_{ID}^{cell}, 4)$.

The DM-RS is defined using a random generator in accordance with the standard [TS 38.211, 7.4.1.4]. It is initialized by the $C_{init}$, defined as:

$$C_{init} = 2^{11} * (i_{SSB} + 1) * (\text{floor}(N_{ID}^{cell}/4) + 1) + 2^{6} * (i_{SSB} + 1) + \mod(N_{ID}^{cell}, 4)$$

$i_{SSB}$ defines the bits (3,2,1) LSB of SSB block index

The DM-RS sequence C(n) is generated as follows in accordance with the standard [38.211, 5.2] as:

$$C(n) = \mod(X_1(n+N_c) + X_2(n+N_c), 2), N_c = 1600$$

$$X_1(n+31) = \mod(X_1(n+3) + X_1(n), 2)$$

$$X_2(n+31) = \mod(X_2(n+3) + X_2(n+2) + X_2(n+1) + X_2(n), 2)$$

$X_1(n)$ is initialized with $X_1(0) = 1$, $X_1(n) = 0$, $n = 1, 2, \ldots, 30$ $X_2(n)$ is initialized with $\text{count} = \sum_{i=0:30} (X_2(i) 2^i)$ The sequence C(n) is then modulated using QPSK as follows:

$$R(m) = ((1 - 2 * C(2m)) + j * (1 - 2 * C(2m+1))) / \text{sqrt}(2)$$

filter and detector that is implemented via the DSP circuitry 306A/306B in the downlink and uplink branches 204A/204B, respectively. In an aspect, once a peak value is detected exceeding a predefined threshold, the synchronization is acquired. This matched filter, PSS detection, and SSS detection may be implemented using any suitable number and type of components that are integrated as part of the IDR 301, as separate boards, dedicated firmware and/or processing circuitry, dedicated hardware components, etc. In an aspect, the matched filter, PSS detection, and SSS detection may be implemented as a separate, dedicated board using Register Transfer Level (RTL) techniques. As an example, the DSP circuitry 306A/306B and/or other components of the control chain circuitry 250 discussed herein may be implemented as any suitable type of processors, a field-programmable gate array, an embedded processor that is implemented as part of an FPGA, etc. The firmware may be implemented, for instance, as any suitable type of executable code (e.g. C code) implemented via an embedded or other suitable type of processor.

In an aspect, after the successful detection of the SSB block, the remaining three OFDM symbols (symbols #1, #2, and #3) are stored in the input buffer. These are then read out by the control circuitry 350 or a separate dedicated board or processor. The SSS and PBCH are then demodulated and decoded in firmware. This is feasible, as the period of SSB repetition is greater than or equal to 20 ms, and thus this is enough time budget to perform demodulation in this manner.

Figure 12:
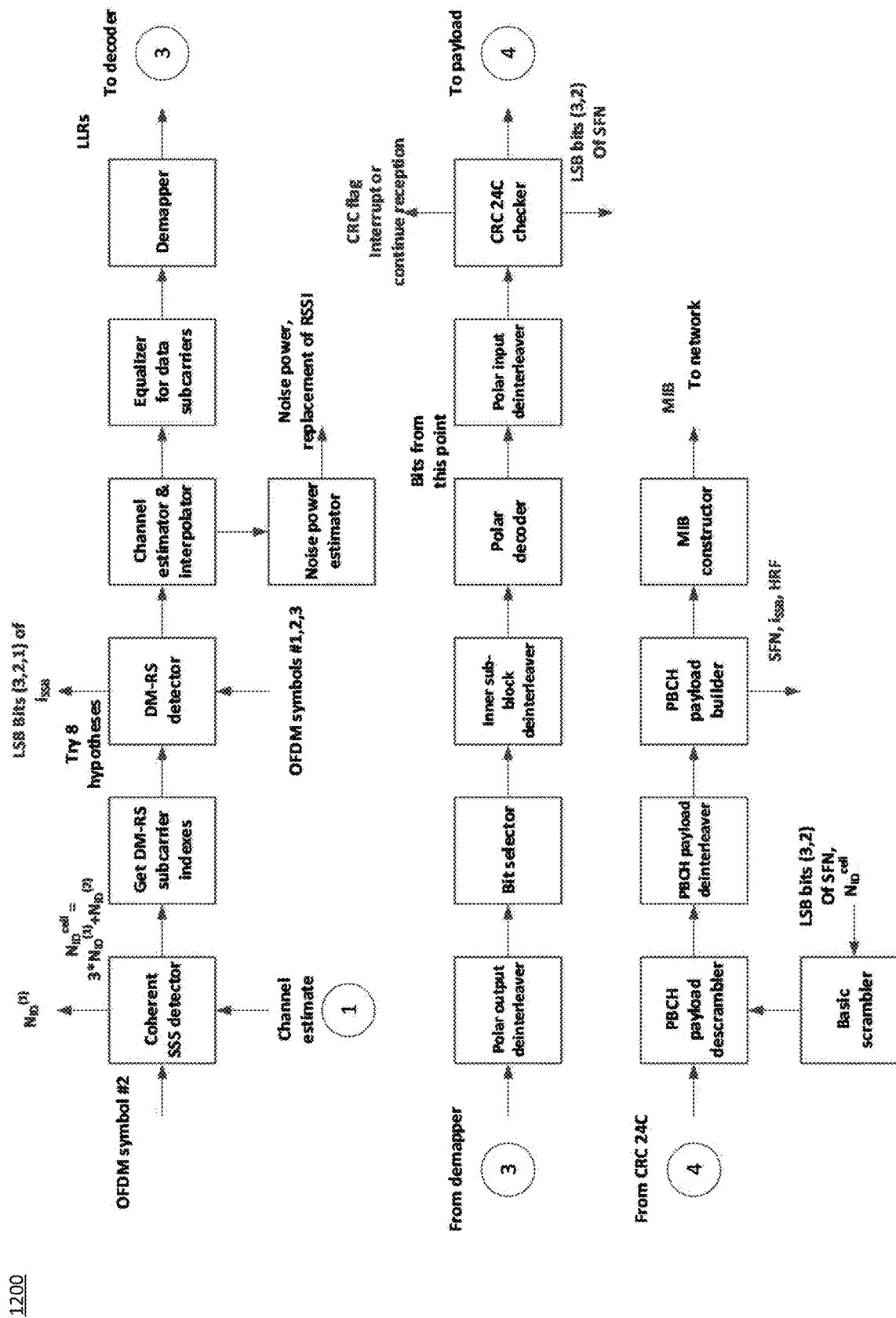
FIG. 12 illustrates an example block diagram of firmware demodulation and decoding of SSS and PBCH implemented by the IDR, in accordance with one or more aspects of the present disclosure.

FIG. 12 illustrates an example block diagram of firmware demodulation and decoding of SSS and PBCH implemented by the IDR 301, in accordance with one or more aspects of the present disclosure. In an aspect, the DSP circuitry 306A of the IDR 301, in this example, may receive one or more of the following list of example control parameters from the SIM circuitry 308 via an IoT interface, as shown in FIG. 3:

PCI—Physical Cell ID, $N_{ID}^{cell}$
TDD pattern parameters—$\{P, d_{slots}, d_{sym}, u_{slots}, u_{sym}\}$
GSCN—Global Synchronization Channel Number.
SSB pattern type—e.g. a 120 kHz pattern or a 240 kHz pattern.
SSB period—default period is 20 us, but it can be changed by the BS via $P_{SSB}$
Bandwidth configuration, i.e. the configuration of all carriers and channel bandwidths used for signal transmission in this geographic location.

In an aspect, the DSP circuitry 306A and/or control circuitry 350 (in the DL example) may then facilitate the decoding one or more of the following set of example SSB parameters by demodulation of the data associated with the SSB, which may occur using one or more of the parameters received via the SIM circuitry 308 as discussed above or independently, in various aspects:

PCI—Physical Cell ID, $N_{ID}^{cell}$
MIB—Master Information Block (see Table 1)
SFN—System Frame Number
HRF—Half Radio Frame bit
SSB index—Synchronization Signal Block index, $i_{SSB}$ In an aspect, the example list of control parameters provided by the SIM circuitry 308 and the SSB parameters decoded via demodulation of the data associated with the SSB as described above may collectively be referred to herein as the control information. These control parameters and SSB parameters are provided herein for the sake of clarity and ease of explanation, and are by way of example and not limitation. The control information used by the IDR 301 in accordance with the aspects as described herein may include alternate, additional, or fewer parameters depending upon the particular application and implementation of the IDR 301. For instance, the control information may include any suitable type of data that may be decoded from base station data signal transmissions and/or decoded from UE data signal transmissions. As another example, the control information may additionally or alternatively include any suitable type of information that may be decoded from received control plane data during operation of the IDR 301, which may be obtained via communication with the base station, one or more UEs, or other devices not shown in the Figures for purposes of brevity.

Synchronization Recovery Process

In an aspect, the DSP circuitry 306A and/or control circuitry 350 uses one or more of the decoded parameters included as part of the control information to perform a synchronization recovery process. For example, the DSP circuitry 306A and/or control circuitry 350 may first detect a peak value provided by the matched filter as shown and discussed above with respect to FIG. 11 to identify the OFDM symbol where detection occurs. Next, the DSP circuitry 306A and/or control circuitry 350 may use the SSB index to count down the indexes and identify the beginning of the frame or half of the frame, which depends upon the HRF. For instance, if the HRF is decoded as a 0 value, then this is the beginning of the frame, whereas if the HRF is decoded as a 1 value, then this is a half frame boundary. The decoded SFN provides the frame number for which detection was acquired.

Thus, the aforementioned parameters allow the TDD pattern to be setup correctly and used in time to implement the TX power reduction as discussed above. In an aspect, although the decoded parameters are used by all devices in the network for synchronization, the IDR 301 may only decode the SSB parameters without decoding data or other parameters.

Simulation Results

Figure 13:
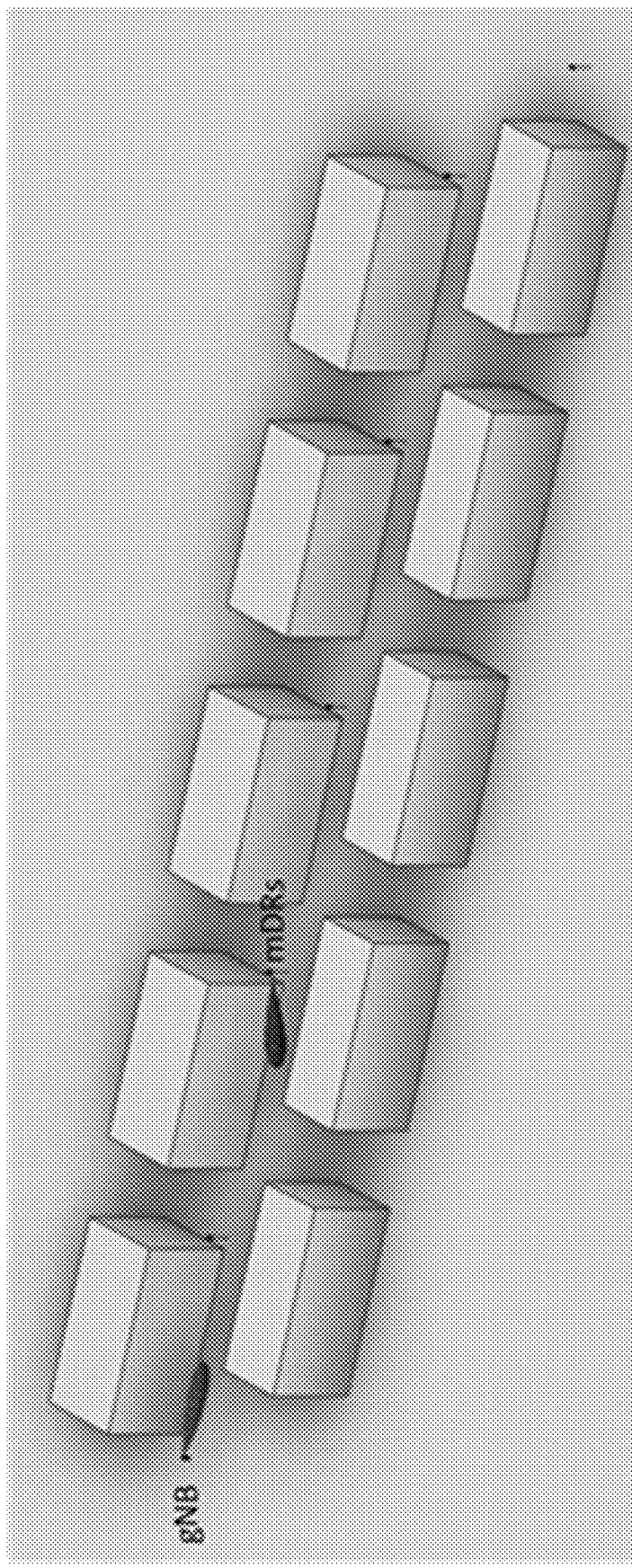
FIG. 13 illustrates an example use case implementing the IDR in a street canyon with multiple junctions, in accordance with one or more aspects of the present disclosure.

A typical deployment scenario for a millimeter distributed relay (mDR) in an urban environment is coverage of areas behind corners and large obstacles, crossing streets, driveways, etc. To re-create such a scenario in simulations, a larger street is considered in which a BS (or gNB) is located and multiple junctions, each covered with the assigned mDR, as shown in FIG. 13. The simulation parameters for the scenario as illustrated in FIG. 13 are listed below in Table 3.

TABLE 3

| Parameter | Value |
|---|---|
| Street width | 30 m |
| Street section length | 300 m |
| Number of mDRs per section | Variable |
| mDR height | 4 m |
| gNB height | 10 m |
| mDR max EIRP | 43 dBm |
| gNB steerable antenna array | 4 × 8 elements, 20 dBi gain |
| Pathloss model | 3GPP UMi, LOS |

It is assumed for the purpose of simulation that the mDR is transparent to the gNB. Nevertheless, while serving UEs through the mDR, the gNB may steer its beam directly towards the mDR, decreasing possible interference from other active mDRs. Under such assumptions, the average SINR for the mDR-gNB uplink transmission is calculated, averaging over multiple pathloss realizations and all mDRs in the area. For a different number of mDRs, the average SINR will degrade as the number of mDRs increases, in comparison with the case of full UL interference avoidance, provided by the IDR 301 transmission adjustments as discussed herein. Results from this simulation are shown below in Table 4.

TABLE 4

| Number of mDRs | mDR spacing | Average donor UL SNR | SINR Degradation |
|---|---|---|---|
| 4 | 100 m | 29.2 dB | −1.1 dB |
| 10 | 40 m | 29.0 dB | −2.6 dB |
| 20 | 20 m | 28.1 dB | −4.2 dB |
| 40 | 10 m | 26.2 dB | −6.3 dB |
| Intelligent mDR UL control SINR | | 32.4 dB | |

As reflected in the results of the simulation summarized in Table 4 above, in a very sparse deployment with 100m between the mDRs, the interference can reduce the SINR by 1.1 dB. This value is increased to significant values with increases in the mDR density, up to 5-6 dB. The aspects described herein facilitate the IDR 301 to control the UL transmission power to fully mitigate this effect.

Beamforming:

Conventionally, an amplify-and-forward relay device such as the architecture 100 as shown in FIG. 1 (e.g. an mDR device) uses a codebook-based approach to set up a directional antenna pattern for the donor side of the link, as shown in FIG. 1. Such codebooks typically include a set of vector values or amplitude and/or phase weightings for a particular antenna array that correlates with specific beam directions and/or shapes. This is typically done to enhance operation by improving the Signal to Noise Ratio (SNR), thus increasing the operational distance between the mDR and the BS. A conventional amplify-and-forward relay device, as shown in FIG. 1, performs scanning over different spatial sectors and measures the receive power for each scanned sector using the power meters as shown. Then, the sector providing the highest receive signal power is selected and used for the donor side of the link.

However, this training process is performed "blindly," since a conventional amplify-and-forward relay device does not perform synchronization, and thus does not have knowledge of the positions of the SSB. Again, the BS transmits the SSBs with different beamforming settings and covering different spatial sectors. In an aspect, the IDR 301 advantageously knows the positions of SSBs, and thus may perform beamforming training for a given BS spatial sector in an intelligent manner, as opposed to the conventional blind scanning approach described above.

Thus, in accordance with an aspect of the present disclosure, the IDR 301 performs beamforming using two phases. During the first of these two phases, the IDR 301 operates to receive signals from the BS via the downlink path in an omnidirectional mode, and power measurements are performed via the power meters in the DL amplify-and-forward branch 204A at the donor side, and these power measurements are then provided to the control circuitry 350. That is, the DL RX array 310 may operate to receive the downlink signals from the BS in an omnidirectional mode such that signals are received from the BS in each of the sectors. As the BS transmits SSBs in different sectors, the control circuitry 350 uses the measurements provided by the power meters on the DL donor side to estimate the received power in each BS transmitted sector, and then selects the best sector based on the measured receive power estimation. This process is similar to conventional amplify-and-forward relay process described above. However, the IDR 301 also performs synchronization by decoding the data received via this sector as noted above prior to proceeding to the second phase.

Figure 14:
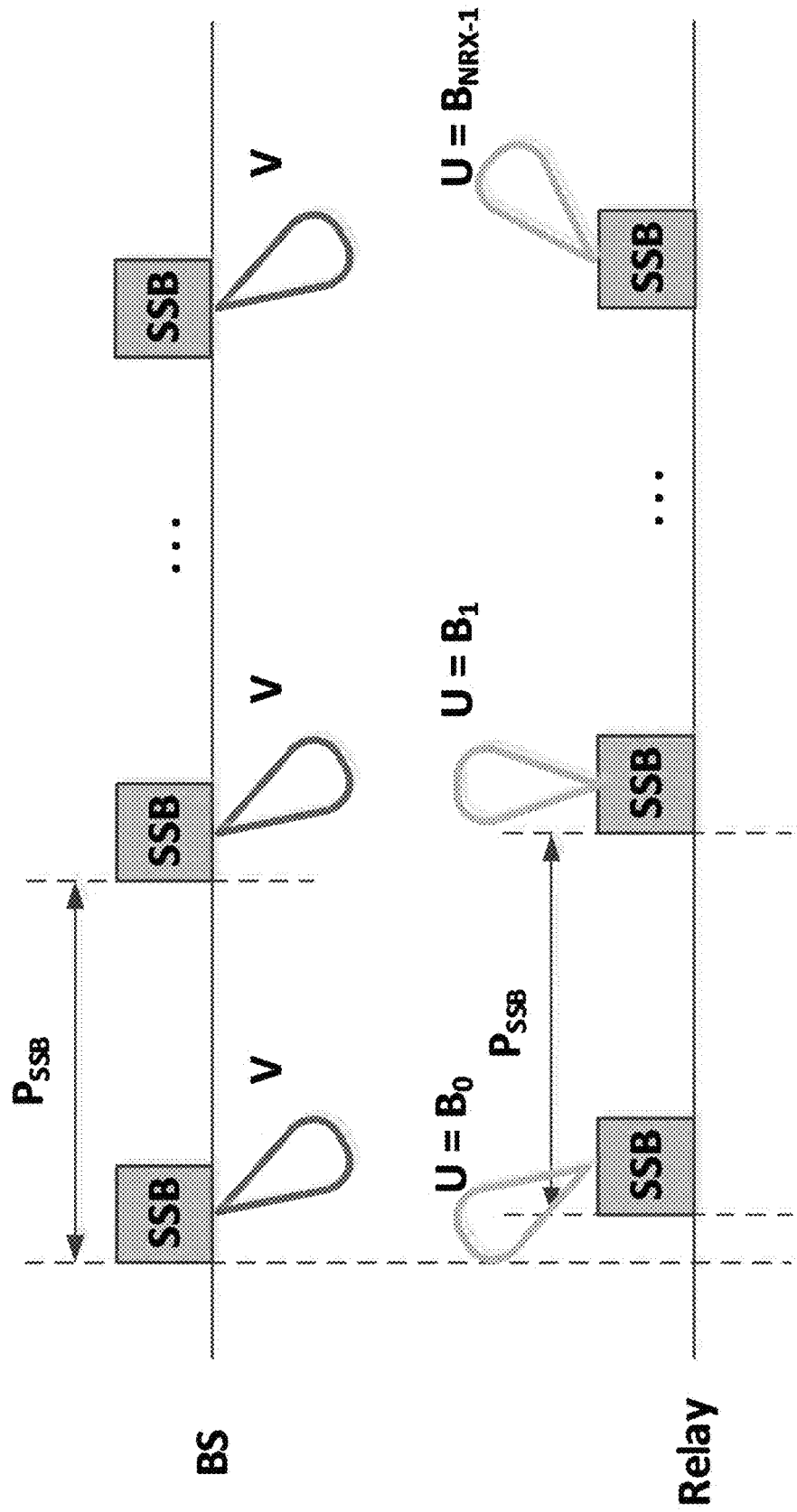
FIG. 14 illustrates an example of a second phase of beamforming training implemented by the IDR, in accordance with one or more aspects of the present disclosure.

In the second phase, the IDR 301 (e.g. the DSP circuitry 306A and/or the control circuitry 350) receives SSBs within the selected TX vector V having a period $P_{SSB}$ (by default it is 20 ms). Next, for each received SSB, the control circuitry 350 changes the receive vector U and assigns one of the vectors $B_i$ from a predetermined codebook associated with this codebook value to the DL RX array 310. An example of this second phase of beamforming training is shown in FIG. 14, which demonstrates the adjustment of the receive vector U for each decoded SSB. In the example shown in FIG. 14, the codebook includes a number of receive vectors Bo to $B_{NRx-i}$, which correspond to the number of receive sectors associated with the DL RX array 310. Thus, the adjustment of the receive vectors associated with the predetermined codebook in this manner adjusts the beamforming pattern used by the DL RX array 310 to receive signals transmitted by the BS.

Additionally, aspects include the IDR 301 enhancing the selected vector U. To do so, the control circuitry 350 may use the DSP circuitry 306A to perform channel estimation on a per subcarrier basis. Aspects include the DSP circuitry 306A using a known demodulation reference (DM-RS) signal, which is transmitted as a part of the SSB. Once decoded, the DSP circuitry 306A and/or the control circuitry 350 may use the channel information included in the DM-RS to further adjust the selected vector U and thus fine tune the beamforming used by the DL RX array 310 to receive the DL signals transmitted by the BS.

Sub Channelization

Figure 15:
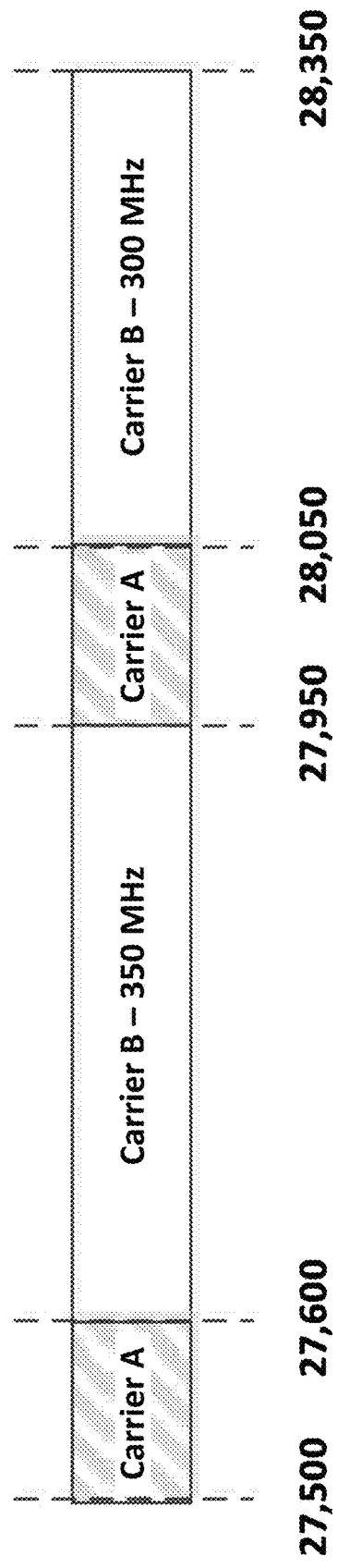
FIG. 15 illustrates an example of non-contiguous spectrum allocation between two different mobile service providers, in accordance with one or more aspects of the present disclosure.

Sub channelization is an important feature for many mobile operators. Moreover, the spectrum allocation for different geographic locations can be non-contiguous and, in some cases, be mixed with mobile operators. FIG. 15 shows an example of non-contiguous spectrum allocation between two mobile operators, which are Carrier A and Carrier B in this example. In the provided example shown in FIG. 15, Carrier B does not own a contiguous spectrum more than 350 MHz. The segmentation pattern may vary from market to market, and may be subject to change over different geographic locations. However, other spectrum owners may deploy their radios at close distance to the radios of Carrier B. In such cases, the function of sub channelization of Carrier B's radios is required for a repeater to filter out the non-owned spectrum and establish a RF link to Carrier B's BS.

In an aspect, sub-channelization may be performed by the IDR 301 using the information provided by the SIM circuitry 308, which includes the bandwidth configuration parameters. These bandwidth configuration parameters are provided to the DSP circuitry 306A via the IoT interface and, in turn, to the control circuitry 350. In an aspect, the control circuitry 350 provides control signals to the filter bank sub-channelization circuitry 302A/302B, which may be implemented as any suitable type of adjustable, tunable, or configurable sub-channelization filter bank in accordance with any suitable bandwidth, frequency range, and frequency response to filter out such sub-channels that may not be part of a mobile operator's spectrum, thereby avoiding re-transmission of these sub-channels. In other words, by adjustment of the filter tuning parameters associated with the filter bank sub-channelization circuitry 302A (in the DL example), the DL amplify-and-forward branch 204 filters out at the desired (i.e. non-carrier) sub-channel from received signals transmitted from the BS such that the subsequently re-transmitted received signals do not include the filtered out sub-channel.

The control circuitry 350 may thus transmit control signals to the filter bank and sub-channelization circuitry 302A, 302B to adjust the filter tuning parameters associated with the filter bank and sub-channelization circuitry 302A, 302B, thereby achieving control of the filter characteristics of the filter bank and sub-channelization circuitry 302A, 302B based upon the decoded bandwidth information. As a result, aspects include this mechanism advantageously allowing for automatic bandwidth installation by request from the BS without any manual support. Moreover, once the bandwidth is configured, it is not typically not changed in time (i.e. it is generally static). Thus, once the control circuitry 350 obtains the bandwidth information, an additional reconfiguration of the bandwidth happens only rarely, and thus the adjustment of the filter bank and sub-channelization circuitry 302A, 302B in this manner does not adversely impact the performance of the IDR 301.

The aspects discussed herein are equally applicable to both the UL and DL directions of the IDR 301, although the examples provided herein generally are with respect to the DL direction for purposes of brevity and ease of explanation. For example, the various intelligent control functions explained herein facilitated by the control chain circuitry 250 may be executed via the control circuitry 350 in combination with any suitable number of other components of the control chain circuitry 250. For instance, the control functions described herein with respect to the components of the control chain circuitry 250 included in the DL amplify-and-forward branch 204A may equally apply to those included in the UL amplify-and-forward branch 204B, excepting for data or other types of transmission that may occur only via base stations transmissions, only via UE transmission, etc.

EXAMPLES

The following examples pertain to further aspects.

Example 1 is an intelligent distributed relay (IDR), comprising: a downlink (DL) amplify-and-forward branch configured to receive signals transmitted from a base station, and to re-transmit the received signals to one or more devices; and control chain circuitry configured to: extract control information using at least data decoded from a synchronization signal block (SSB) associated with at least one of the received signals transmitted from the base station, the control information including one or more parameters that define communications between the base station and the one or more devices; and execute one or more control functions using the extracted control information to adjust the manner in which the DL amplify-and-forward branch subsequently re-transmits received signals transmitted from the base station after the control information is extracted.

In Example 2, the subject matter of Example 1, wherein the control chain circuitry is configured to execute, as the one or more control functions, an acquisition of a synchronization with base station signal transmissions using the extracted control information.

In Example 3, the subject matter of any combination of Examples 1-2, wherein upon acquiring synchronization with the base station signal transmissions, the control chain circuitry is further configured to execute, as the one or more control functions, an adjustment of transmit power of the subsequently re-transmitted received signals transmitted from the base station during a guard period.

In Example 4, the subject matter of any combination of Examples 1-3, wherein: the amplify-and-forward branch is coupled to an antenna array, the control chain circuitry is configured to execute, as the one or more control functions, an adjustment of predetermined codebook values used by the antenna array to thereby modify a beamforming pattern used by the antenna array to receive signals transmitted from the base station, and the adjustment of the predetermined codebook values being performed for each received SSB associated with a respective one of the received signals transmitted from the base station.

In Example 5, the subject matter of any combination of Examples 1-4, wherein: the amplify-and-forward branch includes a filter bank sub-channelization circuitry, the control chain circuitry is configured to execute, as the one or more control functions, an adjustment of filter tuning parameters associated with the filter bank sub-channelization circuitry, and the adjustment of the filter tuning parameters causing the amplify-and-forward branch to filter out at least one sub-channel of received signals transmitted from the base station such that the subsequently re-transmitted received signals do not include the filtered out sub-channel.

In Example 6, the subject matter of any combination of Examples 1-5, further comprising: an uplink (UL) amplify-and-forward branch configured to receive signals transmitted from at least one of the one or more devices, and to re-transmit the received signals to the base station.

In Example 7, the subject matter of any combination of Examples 1-6, wherein: the control chain circuitry is configured to execute, as the one or more control functions, an acquisition of a synchronization with base station signal transmissions using the extracted control information, upon acquiring synchronization with the base station signal transmissions, the control chain circuitry is further configured to execute, as the one or more control functions, (i) an adjustment of transmit power of the subsequently re-transmitted received signals transmitted from the base station during a guard period, and (ii) an adjustment of transmit power of the re-transmitted received signals transmitted from at least one of the one or more devices to the base station during a guard period.

In Example 8, the subject matter of any combination of Examples 1-7, wherein the DL amplify-and-forward branch and the UL amplify-and-forward branch are each configured to operate in accordance with mmWave frequencies.

Example 9 is control chain circuitry associated with an intelligent distributed relay (IDR), the control chain circuitry comprising: a subscriber identity module (SIM) circuitry configured to generate control parameters via association with a base station using received signals transmitted from the base station; digital signal processing (DSP) circuitry configured to receive the control parameters and to use the control parameters to decode SSB parameters from a synchronization signal block (SSB) associated with at least one the received signals transmitted from the base station, the control parameters and the SSB parameters constituting control information defining communications between the base station and one or more devices to which the IDR re-transmits the received signals; and control circuitry configured to execute one or more control functions using the control information to adjust the manner in which the IDR subsequently re-transmits the received signals transmitted from the base station after the control information is obtained.

In Example 10, the subject matter of Example 9, wherein the control circuitry is configured to execute, as the one or more control functions, an acquisition of a synchronization with base station signal transmissions using the control information.

In Example 11, the subject matter of any combination of Examples 9-10, wherein upon acquiring synchronization with the base station signal transmissions, the control circuitry is further configured to execute, as the one or more control functions, an adjustment of transmit power of the subsequently re-transmitted received signals transmitted from the base station during a guard period.

In Example 12, the subject matter of any combination of Examples 9-11, wherein the control chain circuitry is configured to execute, as the one or more control functions, an adjustment of predetermined codebook values used by an antenna array associated with the IDR to receive the signals transmitted from the base station to thereby modify a beamforming pattern used by the antenna array, the adjustment of the predetermined codebook values being performed for each received SSB associated with a respective one of the received signals transmitted from the base station.

In Example 13, the subject matter of any combination of Examples 9-12, further comprising: filter bank sub-channelization circuitry, and wherein the control circuitry is configured to execute, as the one or more control functions, an adjustment of filter tuning parameters associated with the filter bank sub-channelization circuitry to cause the IDR to filter out at least one sub-channel of received signals transmitted from the base station such that the subsequently re-transmitted received signals do not include the filtered out sub-channel.

In Example 14, the subject matter of any combination of Examples 9-13, wherein upon acquiring synchronization with the base station signal transmissions, the control chain circuitry is further configured to execute, as the one or more control functions, an adjustment of transmit power of re-transmitted received signals transmitted from at least one of the one or more devices to the base station during a guard period.

Example 15 is a non-transitory computer-readable medium associated with control chain circuitry of an intelligent distributed relay (IDR), the computer-readable medium having instructions stored thereon that, when executed by one or more components of the control chain circuitry, cause the IDR to: receive, via a downlink (DL) amplify-and-forward branch, signals transmitted from a base station, and to re-transmit the received signals to one or more devices; extract control information using at least data decoded from a synchronization signal block (SSB) associated with at least one of the received signals transmitted from the base station, the control information including one or more parameters that define communications between the base station and the one or more devices; and execute one or more control functions using the extracted control information to adjust the manner in which the DL amplify-and-forward branch subsequently re-transmits received signals transmitted from the base station after the control information is extracted.

In Example 16, the subject matter of Example 15, wherein the one or more control functions include an acquisition of a synchronization with base station signal transmissions using the extracted control information.

In Example 17, the subject matter of any combination of Examples 15-16, wherein the one or more control functions includes, upon acquiring synchronization with the base station signal transmissions, an adjustment of transmit power of the subsequently re-transmitted received signals transmitted from the base station during a guard period.

In Example 18, the subject matter of any combination of Examples 15-17, wherein the one or more control functions include an adjustment of predetermined codebook values used by an antenna array associated with the IDR to receive the signals transmitted from the base station to thereby modify a beamforming pattern used by the antenna array, the adjustment of the predetermined codebook values being performed for each received SSB associated with a respective one of the received signals transmitted from the base station.

In Example 19, the subject matter of any combination of Examples 15-18, wherein the one or more control functions include an adjustment of filter tuning parameters associated with filter bank sub-channelization circuitry to cause the IDR to filter out at least one sub-channel of received signals transmitted from the base station such that the subsequently re-transmitted received signals do not include the filtered out sub-channel.

In Example 20, the subject matter of any combination of Examples 15-19, wherein the one or more control functions include, upon acquiring synchronization with the base station signal transmissions, an adjustment of transmit power of re-transmitted received signals transmitted from at least one of the one or more devices to the base station during a guard period.

Example 21 is an intelligent distributed relay (IDR), comprising: a downlink (DL) amplify-and-forward means for receiving signals transmitted from a base station, and to re-transmit the received signals to one or more devices; and control chain means for: extracting control information using at least data decoded from a synchronization signal block (SSB) associated with at least one of the received signals transmitted from the base station, the control information including one or more parameters that define communications between the base station and the one or more devices; and executing one or more control functions using the extracted control information to adjust the manner in which the DL amplify-and-forward branch subsequently re-transmits received signals transmitted from the base station after the control information is extracted.

In Example 22, the subject matter of Example 21, wherein the control chain means executes, as the one or more control functions, an acquisition of a synchronization with base station signal transmissions using the extracted control information.

In Example 23, the subject matter of any combination of Examples 21-22, wherein upon acquiring synchronization with the base station signal transmissions, the control chain means further executes, as the one or more control functions, an adjustment of transmit power of the subsequently re-transmitted received signals transmitted from the base station during a guard period.

In Example 24, the subject matter of any combination of Examples 21-23, wherein: the amplify-and-forward means is coupled to an antenna array, the control chain means executes, as the one or more control functions, an adjustment of predetermined codebook values used by the antenna array to thereby modify a beamforming pattern used by the antenna array to receive signals transmitted from the base station, and the adjustment of the predetermined codebook values being performed for each received SSB associated with a respective one of the received signals transmitted from the base station.

In Example 25, the subject matter of any combination of Examples 21-24, wherein: the amplify-and-forward means includes filter bank sub-channelization means, the control chain means executes, as the one or more control functions, an adjustment of filter tuning parameters associated with the filter bank sub-channelization means, and the adjustment of the filter tuning parameters causing the amplify-and-forward means to filter out at least one sub-channel of received signals transmitted from the base station such that the subsequently re-transmitted received signals do not include the filtered out sub-channel.

In Example 26, the subject matter of any combination of Examples 21-25, further comprising: an uplink (UL) amplify-and-forward means for receiving signals transmitted from at least one of the one or more devices, and to re-transmit the received signals to the base station.

In Example 27, the subject matter of any combination of Examples 21-26, wherein: the control chain means executes, as the one or more control functions, an acquisition of a synchronization with base station signal transmissions using the extracted control information, upon acquiring synchronization with the base station signal transmissions, the control chain means further executes, as the one or more control functions, (i) an adjustment of transmit power of the subsequently re-transmitted received signals transmitted from the base station during a guard period, and (ii) an adjustment of transmit power of the re-transmitted received signals transmitted from at least one of the one or more devices to the base station during a guard period.

In Example 28, the subject matter of any combination of Examples 21-27, wherein the DL amplify-and-forward means and the UL amplify-and-forward means each operate in accordance with mmWave frequencies.

Example 29 is control chain means associated with an intelligent distributed relay (IDR), the control chain means comprising: a subscriber identity module (SIM) means for generating control parameters via association with a base station using received signals transmitted from the base station; digital signal processing (DSP) means for receiving the control parameters and to use the control parameters to decode SSB parameters from a synchronization signal block (SSB) associated with at least one the received signals transmitted from the base station, the control parameters and the SSB parameters constituting control information defining communications between the base station and one or more devices to which the IDR re-transmits the received signals; and control means for executing one or more control functions using the control information to adjust the manner in which the IDR subsequently re-transmits the received signals transmitted from the base station after the control information is obtained.

In Example 30, the subject matter of Example 29, wherein the control means executes, as the one or more control functions, an acquisition of a synchronization with base station signal transmissions using the control information.

In Example 31, the subject matter of any combination of Examples 29-30, wherein upon acquiring synchronization with the base station signal transmissions, the control means further executes, as the one or more control functions, an adjustment of transmit power of the subsequently re-transmitted received signals transmitted from the base station during a guard period.

In Example 32, the subject matter of any combination of Examples 29-31, wherein the control chain means executes, as the one or more control functions, an adjustment of predetermined codebook values used by an antenna array associated with the IDR to receive the signals transmitted from the base station to thereby modify a beamforming pattern used by the antenna array, the adjustment of the predetermined codebook values being performed for each received SSB associated with a respective one of the received signals transmitted from the base station.

In Example 33, the subject matter of any combination of Examples 29-32, further comprising: filter bank sub-channelization means, and wherein the control means executes, as the one or more control functions, an adjustment of filter tuning parameters associated with the filter bank sub-channelization means to cause the IDR to filter out at least one sub-channel of received signals transmitted from the base station such that the subsequently re-transmitted received signals do not include the filtered out sub-channel.

In Example 34, the subject matter of any combination of Examples 29-33, wherein upon acquiring synchronization with the base station signal transmissions, the control chain means executes, as the one or more control functions, an adjustment of transmit power of re-transmitted received signals transmitted from at least one of the one or more devices to the base station during a guard period.

Example 35 is a non-transitory computer-readable medium associated with control chain means of an intelligent distributed relay (IDR), the computer-readable medium having instructions stored thereon that, when executed by one or more components of the control chain means, cause the IDR to: receive, via a downlink (DL) amplify-and-forward means, signals transmitted from a base station, and to re-transmit the received signals to one or more devices; extract control information using at least data decoded from a synchronization signal block (SSB) associated with at least one of the received signals transmitted from the base station, the control information including one or more parameters that define communications between the base station and the one or more devices; and execute one or more control functions using the extracted control information to adjust the manner in which the DL amplify-and-forward means subsequently re-transmits received signals transmitted from the base station after the control information is extracted.

In Example 36, the subject matter of Example 35, wherein the one or more control functions include an acquisition of a synchronization with base station signal transmissions using the extracted control information.

In Example 37, the subject matter of any combination of Examples 35-36, wherein the one or more control functions includes, upon acquiring synchronization with the base station signal transmissions, an adjustment of transmit power of the subsequently re-transmitted received signals transmitted from the base station during a guard period.

In Example 38, the subject matter of any combination of Examples 35-37, wherein the one or more control functions include an adjustment of predetermined codebook values used by an antenna array associated with the IDR to receive the signals transmitted from the base station to thereby modify a beamforming pattern used by the antenna array, the adjustment of the predetermined codebook values being performed for each received SSB associated with a respective one of the received signals transmitted from the base station.

In Example 39, the subject matter of any combination of Examples 35-38, wherein the one or more control functions include an adjustment of filter tuning parameters associated with filter bank sub-channelization means to cause the IDR to filter out at least one sub-channel of received signals transmitted from the base station such that the subsequently re-transmitted received signals do not include the filtered out sub-channel.

In Example 40, the subject matter of any combination of Examples 35-39, wherein the one or more control functions include, upon acquiring synchronization with the base station signal transmissions, an adjustment of transmit power of re-transmitted received signals transmitted from at least one of the one or more devices to the base station during a guard period.

An apparatus as shown and described.

A method as shown and described.

CONCLUSION

As referenced herein, the term "mmWave frequency," or "mmWave bands," which the aspects described herein may operate, may include, for example, frequencies and frequency bands above 20 GHz, 24 GHz, 28 GHz, etc., up to an upper frequency. For instance, mmWave frequency bands may include frequencies ranging from 20 GHz to 300 GHz, from 24 GHz to 300 GHz, etc. This may include, for instance, the various bands known to be associated with or otherwise referred to as mm-Wave frequency bands such as 24 GHz, 28 GHz, 37 GHz, 39 GHz, 40 GHz, 47 GHz, 60 GHz, etc. Moreover, these bands are by way of example and not limitation, and the aspects described herein may encompass any suitable range of frequencies outside of the mmWave frequency bands described above and/or the aforementioned mmWave frequency bands may include additional, fewer, or alternate frequency bands than the examples described.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. An intelligent distributed relay (IDR), comprising:
a downlink (DL) amplify-and-forward branch configured to receive signals transmitted from a base station, and to re-transmit the received signals to one or more devices; and
control chain circuitry configured to:
extract control information using data decoded from a synchronization signal block (SSB) associated with one of the received signals transmitted from the base station, the control information including one or more parameters that define communications between the base station and the one or more devices; and
execute one or more control functions using the extracted control information to adjust the manner in which the DL amplify-and-forward branch subsequently re-transmits received signals transmitted from the base station after the control information is extracted,
wherein the control chain circuitry is configured to execute, as the one or more control functions, an acquisition of a synchronization with base station signal transmissions using the extracted control information, and
wherein, upon acquiring synchronization with the base station signal transmissions, the control chain circuitry is further configured to execute, as the one or more control functions, an adjustment of transmit power of subsequently re-transmitted received signals transmitted from one of (i) the base station, or (ii) one of the one or more devices, during a guard period.

2. The IDR of claim 1, further comprising:
an uplink (UL) amplify-and-forward branch configured to receive signals transmitted from one of the one or more devices, and to re-transmit the received signals to the base station.

3. The IDR of claim 2, wherein the DL amplify-and-forward branch and the UL amplify-and-forward branch are each configured to operate in accordance with mmWave frequencies.

4. A non-transitory computer-readable medium associated with control chain circuitry of an intelligent distributed relay (IDR), the computer-readable medium having instructions stored thereon that, when executed by one or more components of the control chain circuitry, cause the IDR to:
receive, via a downlink (DL) amplify-and-forward branch, signals transmitted from a base station, and to re-transmit the received signals to one or more devices;
extract control information using data decoded from a synchronization signal block (SSB) associated with one of the received signals transmitted from the base station, the control information including one or more parameters that define communications between the base station and the one or more devices; and execute one or more control functions using the extracted control information to adjust the manner in which the DL amplify-and-forward branch subsequently re-transmits received signals transmitted from the base station after the control information is extracted, and wherein the one or more control functions include:
an acquisition of a synchronization with base station signal transmissions using the extracted control information, and
upon acquiring synchronization with the base station signal transmissions, an adjustment of transmit power of the subsequently re-transmitted received signals transmitted from one of (i) the base station, or (ii) one of the one or more devices, during a guard period.

5. The non-transitory computer-readable medium of claim 4, wherein the instructions, when executed by one or more components of the control chain circuitry, further cause the IDR to:
receive, via an uplink (UL) amplify-and-forward branch, signals transmitted from one of the one or more devices, and to re-transmit the received signals to the base station.

6. The non-transitory computer-readable medium of claim 5, wherein the instructions, when executed by one or more components of the control chain circuitry, further cause the IDR to operate the DL amplify-and-forward branch and the UL amplify-and-forward branch in accordance with mmWave frequencies.

7. An intelligent distributed relay (IDR), comprising:
a downlink (DL) amplify-and-forward branch coupled to an antenna array and configured to receive signals transmitted from a base station, and to re-transmit the received signals to one or more devices; and
control chain circuitry configured to:
extract control information using data decoded from a synchronization signal block (SSB) associated with one of the received signals transmitted from the base station, the control information including one or more parameters that define communications between the base station and the one or more devices; and
execute one or more control functions using the extracted control information to adjust the manner in which the DL amplify-and-forward branch subsequently re-transmits received signals transmitted from the base station after the control information is extracted,
wherein the control chain circuitry is configured to execute, as the one or more control functions, an adjustment of predetermined codebook values used by the antenna array to thereby modify a beamforming pattern used by the antenna array to receive signals transmitted from the base station, the adjustment of the predetermined codebook values being performed for each received SSB associated with a respective one of the received signals transmitted from the base station.

8. The IDR of claim 7, further comprising:
an uplink (UL) amplify-and-forward branch configured to receive signals transmitted from one of the one or more devices, and to re-transmit the received signals to the base station.

9. The IDR of claim 8, wherein the DL amplify-and-forward branch and the UL amplify-and-forward branch are each configured to operate in accordance with mmWave frequencies.

10. An intelligent distributed relay (IDR), comprising:
a downlink (DL) amplify-and-forward branch including a filter bank sub-channelization circuitry and configured to receive signals transmitted from a base station, and to re-transmit the received signals to one or more devices; and
control chain circuitry configured to:
extract control information using data decoded from a synchronization signal block (SSB) associated with one of the received signals transmitted from the base station, the control information including one or more parameters that define communications between the base station and the one or more devices; and
execute one or more control functions using the extracted control information to adjust the manner in which the DL amplify-and-forward branch subsequently re-transmits received signals transmitted from the base station after the control information is extracted,
wherein the control chain circuitry is configured to execute, as the one or more control functions, an adjustment of filter tuning parameters associated with the filter bank sub-channelization circuitry, and
wherein the adjustment of the filter tuning parameters causes the DL amplify-and-forward branch to filter a sub-channel of received signals transmitted from the base station such that the subsequently re-transmitted received signals do not include the filtered out sub-channel.

11. The IDR of claim 10, further comprising:
an uplink (UL) amplify-and-forward branch configured to receive signals transmitted from one of the one or more devices, and to re-transmit the received signals to the base station.

12. The IDR of claim 11, wherein the DL amplify-and-forward branch and the UL amplify-and-forward branch are each configured to operate in accordance with mmWave frequencies.

13. A non-transitory computer-readable medium associated with control chain circuitry of an intelligent distributed relay (IDR), the computer-readable medium having instructions stored thereon that, when executed by one or more components of the control chain circuitry, cause the IDR to:
receive, via a downlink (DL) amplify-and-forward branch, signals transmitted from a base station, and to re-transmit the received signals to one or more devices;
extract control information using data decoded from a synchronization signal block (SSB) associated with one of the received signals transmitted from the base station, the control information including one or more parameters that define communications between the base station and the one or more devices; and
execute one or more control functions using the extracted control information to adjust the manner in which the DL amplify-and-forward branch subsequently re-transmits received signals transmitted from the base station after the control information is extracted,
wherein the one or more control functions include an adjustment of predetermined codebook values used by an antenna array associated with the IDR to receive the signals transmitted from the base station to thereby modify a beamforming pattern used by the antenna array, the adjustment of the predetermined codebook values being performed for each received SSB associated with a respective one of the received signals transmitted from the base station.

14. The non-transitory computer-readable medium of claim 13, wherein the instructions, when executed by one or more components of the control chain circuitry, further cause the IDR to:
receive, via an uplink (UL) amplify-and-forward branch, signals transmitted from one of the one or more devices, and to re-transmit the received signals to the base station.

15. The non-transitory computer-readable medium of claim 14, wherein the instructions, when executed by one or more components of the control chain circuitry, further cause the IDR to operate the DL amplify-and-forward branch and the UL amplify-and-forward branch in accordance with mmWave frequencies.

16. A non-transitory computer-readable medium associated with control chain circuitry of an intelligent distributed relay (IDR), the computer-readable medium having instructions stored thereon that, when executed by one or more components of the control chain circuitry, cause the IDR to:
receive, via a downlink (DL) amplify-and-forward branch, signals transmitted from a base station, and to re-transmit the received signals to one or more devices;
extract control information using data decoded from a synchronization signal block (SSB) associated with one of the received signals transmitted from the base station, the control information including one or more parameters that define communications between the base station and the one or more devices; and
execute one or more control functions using the extracted control information to adjust the manner in which the DL amplify-and-forward branch subsequently re-transmits received signals transmitted from the base station after the control information is extracted,
wherein the one or more control functions include an adjustment of filter tuning parameters associated with filter bank sub-channelization circuitry to cause the IDR to filter a sub-channel of received signals transmitted from the base station such that the subsequently re-transmitted received signals do not include the filtered out sub-channel.

17. The non-transitory computer-readable medium of claim 16, wherein the instructions, when executed by one or more components of the control chain circuitry, further cause the IDR to:
receive, via an uplink (UL) amplify-and-forward branch, signals transmitted from one of the one or more devices, and to re-transmit the received signals to the base station.

18. The non-transitory computer-readable medium of claim 17, wherein the instructions, when executed by one or more components of the control chain circuitry, further cause the IDR to operate the DL amplify-and-forward branch and the UL amplify-and-forward branch in accordance with mmWave frequencies.

* * * * *